(12) United States Patent
Marelas

(10) Patent No.: US 10,659,483 B1
(45) Date of Patent: May 19, 2020

(54) AUTOMATED AGENT FOR DATA COPIES VERIFICATION

(71) Applicant: EMC IP Holding Company LLC, Hopkinton, MA (US)

(72) Inventor: Peter Marelas, Donvale (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 241 days.

(21) Appl. No.: 15/799,088

(22) Filed: Oct. 31, 2017

(51) Int. Cl.
*H04L 29/06* (2006.01)
*G06N 20/00* (2019.01)

(52) U.S. Cl.
CPC ........ *H04L 63/1425* (2013.01); *H04L 63/123* (2013.01); *G06N 20/00* (2019.01)

(58) Field of Classification Search
CPC ... H04L 63/1425; H04L 63/123; G06N 20/00; G06F 3/0641; G06F 3/067; G06F 3/0608; G06F 16/1748; G06F 16/27; G06F 16/137; G06F 16/22
USPC .......................................................... 726/23
See application file for complete search history.

(56) References Cited

U.S. PATENT DOCUMENTS

| | | | |
|---|---|---|---|
| 7,089,241 B1 | 8/2006 | Alsprctor et al. | |
| 7,702,631 B1 | 4/2010 | Basu et al. | |
| 7,899,796 B1 | 3/2011 | Borthwick et al. | |
| 8,126,852 B1 * | 2/2012 | Patterson | G06F 16/1748 707/680 |
| 9,075,532 B1 * | 7/2015 | Bromley | G06F 3/0641 |
| 9,378,106 B1 * | 6/2016 | Ben-Moshe | G06F 11/2094 |
| 9,396,243 B1 * | 7/2016 | Halevi | G06F 16/27 |
| 2002/0055942 A1 * | 5/2002 | Reynolds | G06F 21/64 |
| 2002/0152375 A1 * | 10/2002 | Shigematsu | H04L 63/0861 713/155 |
| 2004/0015724 A1 * | 1/2004 | Pham | H04L 63/102 713/179 |
| 2004/0153653 A1 * | 8/2004 | Abhyankar | G06F 21/6209 713/179 |
| 2005/0131902 A1 * | 6/2005 | Saika | G06F 16/10 |
| 2007/0050620 A1 * | 3/2007 | Pham | G06F 21/6218 713/165 |
| 2007/0180239 A1 * | 8/2007 | Fujibayashi | G06F 11/1076 713/165 |
| 2008/0065630 A1 | 3/2008 | Luo et al. | |
| 2008/0091818 A1 | 4/2008 | Bailey et al. | |
| 2009/0132616 A1 * | 5/2009 | Winter | G06F 11/1451 |
| 2009/0177484 A1 | 7/2009 | Davis et al. | |
| 2010/0082672 A1 * | 4/2010 | Kottomtharayil | G06F 11/1451 707/770 |
| 2010/0250501 A1 | 9/2010 | Mandagere et al. | |

(Continued)

OTHER PUBLICATIONS

IEEE P1619.3/D1, Draft Standard for Key Management Infrastructure for Cryptographic Protection of Stored Data ( May 2007), IEEE, Piscataway, NJ (Year: 2007).*

(Continued)

*Primary Examiner* — Syed A Zaidi
(74) *Attorney, Agent, or Firm* — Chamberlain, Hrdlicka, White, Williams & Aughtry

(57) ABSTRACT

The implementation of an automated agent for data copies verification. Specifically, the implementation entails the execution of an intelligent, machine-learning based method and system for determining the integrity of data copies (i.e., for identifying whether data copies of a same data set have been impacted by malicious activities).

20 Claims, 13 Drawing Sheets

(56) References Cited

U.S. PATENT DOCUMENTS

| | | | |
|---|---|---|---|
| 2010/0250896 A1* | 9/2010 | Matze | G06F 3/0608 711/216 |
| 2010/0281081 A1* | 11/2010 | Stager | G06F 9/5022 707/814 |
| 2011/0026898 A1* | 2/2011 | Lussier | G11B 27/034 386/280 |
| 2011/0055471 A1* | 3/2011 | Thatcher | G06F 3/0608 711/114 |
| 2012/0016848 A1* | 1/2012 | Tofano | G06F 3/0641 707/694 |
| 2012/0159175 A1* | 6/2012 | Yocom-Piatt | G06F 11/1453 713/176 |
| 2012/0237180 A1* | 9/2012 | Yoshioka | H04N 19/60 386/239 |
| 2014/0187239 A1* | 7/2014 | Friend | H04L 29/08 455/426.1 |
| 2014/0188986 A1* | 7/2014 | Levy | H04W 4/029 709/203 |
| 2014/0277604 A1 | 9/2014 | Nixon et al. | |
| 2015/0006475 A1* | 1/2015 | Guo | G06F 16/1752 707/609 |
| 2015/0127621 A1* | 5/2015 | Kuo | G06F 3/061 707/692 |
| 2016/0004975 A1 | 1/2016 | Chamness et al. | |
| 2016/0019282 A1 | 1/2016 | Lewis et al. | |
| 2016/0098021 A1 | 4/2016 | Zornio et al. | |
| 2016/0314412 A1 | 10/2016 | Chamness et al. | |

OTHER PUBLICATIONS

NPL Search Results (Year: 2020).*
Kolb, Lars et al. "Dedoop: Efficient deduplication with hadoop" Proceedings of the VLDB Endowment 5.12 (2012) 1878-1881 (4 pages).
Sarawagi, S. et al., "Interactive deduplication using active learning" In Proceedings of the eighth ACM SIGKDD International Conference on Knoledge discovery and data mining, (KDD '02). ACM, New York, NY, USA, 269-278 (2012) (10 pages).
Dinerstein, Jared et al., "Learning-based Fusion for Data Deduplication", 2008 Seventh International Conference on Machine Learning and Applications, IEEE Computer Society, 2008 (6 pages).

* cited by examiner

AUTOMATED AGENT FOR DATA COPIES VERIFICATION

BACKGROUND

Computing systems generate an unfathomable amount of data copies during various operations. Presently, assessing the integrity of data copies is a largely uncommon task due to the sheer volume of data involved, as well as the storage and processing needs required to perform the assessments.

DETAILED DESCRIPTION

Figure 1:
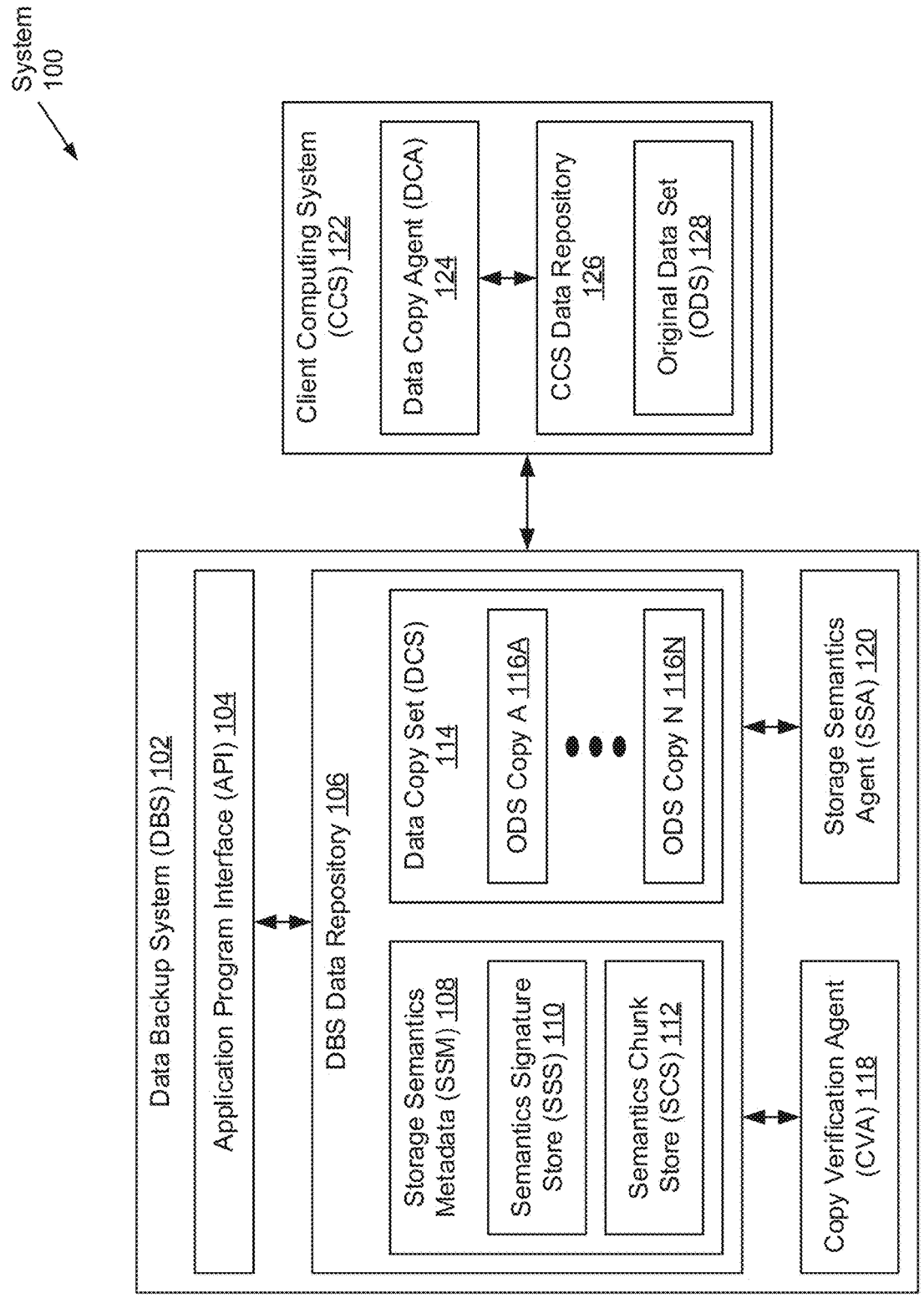
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-9, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to the implementation of an automated agent for data copies verification. Specifically, one or more embodiments of the invention entails the execution of an intelligent, machine-learning based method and system for determining the integrity of data copies (i.e., for identifying whether data copies of a same data set have been impacted by malicious activities).

In one embodiment of the invention, the integrity of a data copy may be compromised as a result of various causes. By way of an example, data integrity may be compromised by the unauthorized modification of data (e.g., a data copy) induced by a cyber security threat or attack. A cyber security threat/attack may be a malicious computer program that targets, and subsequently, exploits one or more vulnerabilities on a computing system (i.e., the computing system whereon the original data associated with the data copy resides, or whereon the data copy was generated). Examples of cyber security threats/attacks include, but are not limited to including: malware, phishing attacks, password attacks, denial-of-service (DOS) attacks, man-in-the-middle (MITM) attacks, structured query language (SQL) injection attacks, cross-site scripting (XSS) attacks, session hijacking attacks, spear-phishing attacks, network probing attacks, brute-force cracking attacks, drive-by download attacks, advanced persistent threat (APT) attacks, and ransomware.

In one embodiment of the invention, a vulnerability on a computing system may be a flaw or weakness in system design, implementation, operation, internal controls, or management that could be exploited (either accidentally or intentionally). Further, exploitation of a vulnerability may result in a security breach of the computing system, which may lead to, for example, data loss, exposure of sensitive data, lack of accountability, denial of access, data corruption, system hijacking and/or impersonation, and other undesirable outcomes.

FIG. 1 shows a system in accordance with one or more embodiments of the invention. The system (100) includes a data backup system (DBS) (102) operatively connected to a client computing system (CCS) (122). Each of these components is described below.

In one embodiment of the invention, the aforementioned components may be directly or indirectly connected to one another through a network (e.g., a local area network (LAN), a wide area network (WAN) such as the Internet, a mobile network, or any other network). The network (not shown) may be implemented using any combination of wired and/or wireless connections. In embodiments in which the aforementioned components are indirectly connected, there may be other networking components or systems (e.g., switches, routers, gateways, etc.) that facilitate communication and/or information exchange. Further, the aforementioned components may communicate with one another using any combination of wired and/or wireless communication protocols.

In one embodiment of the invention, the DBS (102) may be a data consolidation platform that services one or more CCSs (122). The data consolidated on the DBS (102) may be pertinent to, for example, data backup operations, data archiving operations, and/or disaster recovery operations. Further, the DBS (102) may be implemented on one or more servers (not shown). Each server may be a physical server (i.e., in a datacenter) or a virtual server (i.e., that may be cloud-based). In one embodiment of the invention, the DBS (102) may be implemented on one or more computing systems similar to the exemplary computing system shown in FIG. 9. Moreover, the DBS (102) may be any set of computing systems that may be programmed to receive requests, process requests, and based on the processing of requests, extend services and/or resources to one or more CCS (122).

In one embodiment of the invention, the DBS (102) may include an application program interface (API) (104), a DBS data repository (106), a copy verification agent (CVA) (118), and a storage semantics agent (SSA) (120). Each of these components is described below.

In one embodiment of the invention, the API (104) may be a hardware and/or software implemented construct that employs a set of subroutine definitions, protocols, and/or tools for structuring information exchange between the DBS (102) and a CCS (122). For example, the API (104) may establish that the exchange of information may entail a request for processing, and a return of a response, if any, based on the outcome of the processing. In one embodiment of the invention, the API (104) may be a web API accessed through an assigned web address (e.g., a uniform resource locator (URL)) and a WAN (e.g., Internet) connection.

In one embodiment of the invention, the DBS data repository (106) may be a storage system or medium for consolidating various forms of data. The DBS data repository (106) may be implemented using any type of storage unit and/or device (e.g., a filesystem, a database, a collection of tables, or any other storage mechanism). Further, the DBS data repository (106) may be implemented using multiple storage units and/or devices, which may or may not be of the same type or located at the same physical site. In one embodiment of the invention, the DBS data repository (106) may be implemented using persistent (i.e., non-volatile) storage media. Examples of the persistent storage media include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, the DBS data repository (106) may be configured to store storage semantics metadata (SSM) (108). SSM (108) may refer to data that describes data copies (i.e., ODS copies (116A-116N)) that have undergone data deduplication. Further, SSM (108) may be segmented into one of two stores: (1) a semantics signature store (SSS) (110), and (2) a semantics chunk store (SCS) (112). Each of these components is described below.

In one embodiment of the invention, the SSS (110) may be a repository for consolidating mappings relating signature indices to digital signatures, and subsequently, to chunk indices. The SSS (110) is described in further detail below with respect to FIG. 2B. In one embodiment of the invention, the SCS (112) may be a repository for consolidating mappings relating chunk indices to data chunks. The SCS (112) is described in further detail below with respect to FIG. 2C.

In one embodiment of the invention, the DBS data repository (106) may be further configured to store one or more data copy sets (DCSs) (114). A DCS (114) may be a collection of one or more ODS copies (116A-116N). Further, each ODS copy (116A-116N) may be an exact copy of an associated ODS (128) for a given time. Subsequently, each ODS copy (116A-116N) may include exact copies of one or more data objects representing the associated ODS (128) for a given time. In general, a data object may refer to any computer readable information encoded in any computer readable format. Examples of data objects include, but are not limited to, image files, audio files, video files, multimedia files, binary files, computer instructions, executables (i.e., computer programs/processes), archive files, text files, disk volumes, and disk logical unit numbers (LUNs).

One of ordinary skill will appreciate that the DBS data repository (106) may consolidate other information without departing from the scope of the invention.

In one embodiment of the invention, the CVA (118) may be a computer program, or a computer process (i.e., an instance of a computer program), executing on the underlying hardware of the DBS (102). In another embodiment of the invention, the CVA (118) may be a computer program or process executing on the underlying hardware of another computing system (e.g., the CCS (122), etc.) external, however, operatively connected, to the DBS (102). In the latter embodiment, the CVA (118) may subsequently service multiple DBSs (102) through one or more APIs (104) between the CVA (118) and one or more DBSs (102). Further, the CVA (118) may be a computer program or process tasked with the verification of data copies (i.e., ODS copies (116A-116N)) in accordance with embodiments of the invention (see e.g., FIGS. 5A and 5B). Towards verifying data copies, the CVA (118) may include further functionality to generate copy embeddings (see e.g., FIG. 6) and generate similarity measure thresholds (SMTs) (see e.g., FIGS. 8A-8C) in accordance with embodiments of the invention. The CVA (118) is described in further detail below with respect to FIG. 3.

In one embodiment of the invention, the SSA (120) may be a computer program, or a computer process (i.e., an instance of a computer program), executing on the underlying hardware of the DBS (102). Specifically, the SSA (120) may be a computer program or process tasked with implementing data deduplication on the DBS (102). More specifically, the SSA (120) may include functionality, for each DCS (114) stored in the DBS data repository (106), to: (i) subject the DCS (114) (i.e., including one or more ODS copies (116A-116N)) through one or more existing or future developed data deduplication algorithms; (ii) based on the subjecting, obtain (a) zero or more new unique (i.e., not previously catalogued) data chunks specified in the DCS (114), and (b) one or more signatures (i.e., new and/or previously catalogued) representing the raw data (i.e., binary information) specified in the DCS (114); (iii) update the SCS (112) using at least the aforementioned zero or more unique data chunks, as well as update the SSS (110) using at least one or more new signatures corresponding to the aforementioned one or more new unique data chunks; and (iv) replace the raw data specified in each ODS copy (116A-116N) of the DCS (114) with references (i.e., signature indices (see e.g., FIG. 2A)) to a set of signatures that represent the raw data.

In one embodiment of the invention, the CCS (122) may be any computing system (see e.g., FIG. 9) that employs the DBS (102) for data consolidation purposes. Specifically, the CCS (122) may be any computing system used for various applications. These applications may, for example, require large-scale and complex data processing. In one embodiment of the invention, the CCS (122) may be any computing system that may service multiple users concurrently. Moreover, the CCS (122) may be programmed to provide and manage the allocation of computing resources (e.g., computer processors, memory, persistent and non-persistent storage, network bandwidth, etc.) towards the execution of various processes (i.e., tasks) that may be instantiated by one or more users thereon. Examples of the CCS (122) include, but are not limited to including, one or more: desktop computers, laptop computers, smartphones, tablet computers, gaming consoles, servers, mainframes, virtual machines, or any combination thereof.

In one embodiment of the invention, the CCS (122) may include a data copy agent (DCA) (124) and a CCS data repository (126). Each of these components is described below.

In one embodiment of the invention, the DCA (124) may be a computer program, or a computer process (i.e., an instance of a computer program), executing on the underlying hardware of the CCS (122). Specifically, the DCA (124) may be a computer program or process tasked with replicating, or generating copies of, one or more original data sets (ODSs) (128) (described below). ODS (128) replication may entail producing an exact copy of the ODS (128)—i.e., an ODS copy (116A-116N)—using any existing or future developed data replication algorithm. The DCA (124) may include further functionality to submit requests to the DBS (102) including at least any generated ODS copies (116A-116N). The submitted requests may pertain to storing the ODS copies (116A-116N) as part of a variety of operations, which include, but are not limited to, data backup operations, data archiving operations, and disaster recovery operations.

In one embodiment of the invention, the CCS data repository (126) may be a storage system or medium for consolidating various forms of data. The CCS data repository (126) may be implemented using any type of storage unit and/or device (e.g., a filesystem, a database, a collection of tables, or any other storage mechanism). Further, the CCS data repository (126) may be implemented using multiple storage units and/or devices, which may or may not be of the same type or located at the same physical site. In one embodiment of the invention, the data repository (126) may be implemented using persistent (i.e., non-volatile) storage media. Examples of storage media include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as a non-volatile Storage Class Memory (SCM).

In one embodiment of the invention, the CCS data repository (126) may be configured to store one or more original data sets (ODSs) (126). A or each ODS (126) may be a collection of one or more data objects that have been generated, used, or otherwise reside on the CCS (122). In general, a data object may refer to any computer readable information encoded in any computer readable format. Examples of data objects include, but are not limited to, image files, audio files, video files, multimedia files, binary files, computer instructions, executables (i.e., computer programs/processes), text files, disk volumes, and disk logical unit numbers (LUNs).

One of ordinary skill will appreciate that the CSS data repository (126) may consolidate other information without departing from the scope of the invention.

While FIG. 1 shows a configuration of components, other system configurations may be used without departing from the scope of the invention. For example, the system (100) may include multiple (i.e., more than one) CCSs (122) may be operatively connected, and thus employ, the DBS (102). By way of another example, the system (100) may include an additional storage system (not shown) operatively connected to the DBS (102) and used, by the DBS (102), for consolidating verified data copies (i.e., verified ODS copies (116A-116N)). By way of yet another example, the system (100) may include an inspection computing system (ICC) (not shown) operatively connected to the DBS (102), and used by operators (e.g., data integrity and/or cyber security professionals) to perform human intervening inspections on a select set of data copies submitted by the CVA (118).

Figure 2A:
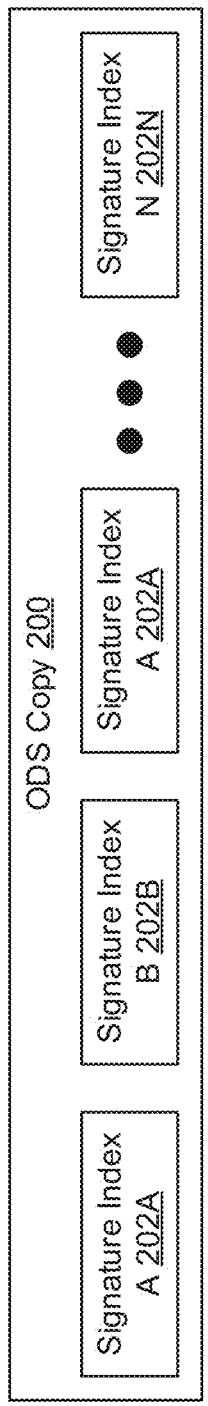
FIG. 2A shows an original data set copy in accordance with one or more embodiments of the invention.

FIG. 2A shows an original data set (ODS) copy in accordance with one or more embodiments of the invention. As described above, an ODS copy (200) may be an exact copy of an ODS (126) associated with a given time. Subsequently, in one embodiment of the invention, prior to being subjected to data deduplication, the ODS copy (200) may include raw data (i.e., binary information) pertaining to a collection of one or more replicated data objects (i.e., exact copies of one or more data objects that had resided on a CCS (see e.g., FIG. 1) at the given time). However, after data deduplication performed by the storage semantics agent (SSA) (see e.g., FIG. 1), the ODS copy (200) may be represented through a set of one or more signature indices (202A-202N). Each signature index (202A-202N) may be a referencing object that contains a memory address to a semantics signature store (SSS) entry (212A-212N) consolidated in the SSS (210) (see e.g., FIG. 2B). Subsequently, each signature index (202A-202N) maps to a unique data chunk (224) consolidated in the semantics chunk store (SCS) (220) (see e.g., FIG. 2C).

Figure 2B:
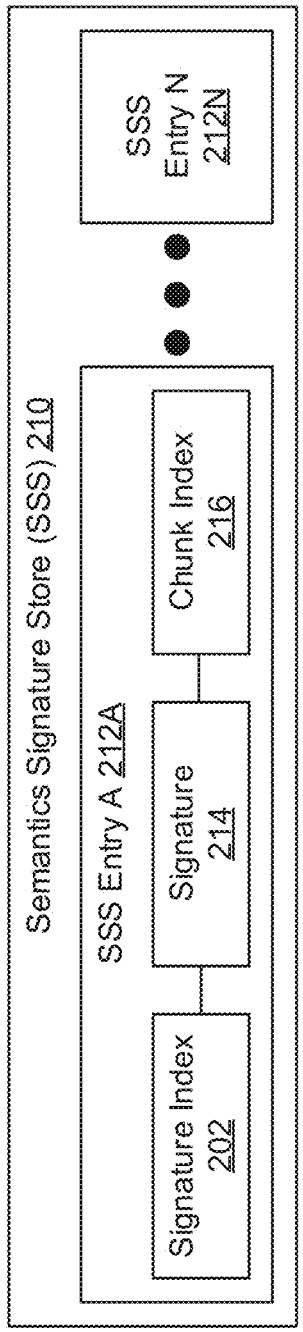
FIG. 2B shows a semantics signature store in accordance with one or more embodiments of the invention.

FIG. 2B shows a semantics signature store (SSS) in accordance with one or more embodiments of the invention. The SSS (210) may be a repository that consolidates and maintains one or more SSS entries (212A-212N). Each SSS entry (212A-212N) may store a mapping relating a signature index (202) (described above) to a digital signature (214), and subsequently, to a chunk index (216). Furthermore, the SSS (210) may be programmed by the SSA (see e.g., FIG. 1) during data deduplication operations.

In one embodiment of the invention, a digital signature (214), or fingerprint, may be a bit string that uniquely identifies a data chunk (224) (described below). The digital signature (214) may be generated by subjecting the corresponding data chunk (224) through a hashing function (not shown). The hashing function may employ any combination of existing or future developed cryptographic algorithms. Subsequently, the digital signature (214) may be a hash value, a hash code, or a digest outputted by the hashing function given the corresponding data chunk (224) as input. Further, the digital signature (214) may be of any specified length, though typically, the digital signature (214) may be substantially smaller in size than the data chunk (224) to which the digital signature (214) corresponds. By way of an example, each digital signature (214) may be 20 bytes long. In one embodiment of the invention, the chunk index (216) may be a referencing object that contains a memory address to a semantics chunk store (SCS) entry (222A-222N) consolidated in the SCS (220) (see e.g., FIG. 2C).

Figure 2C:
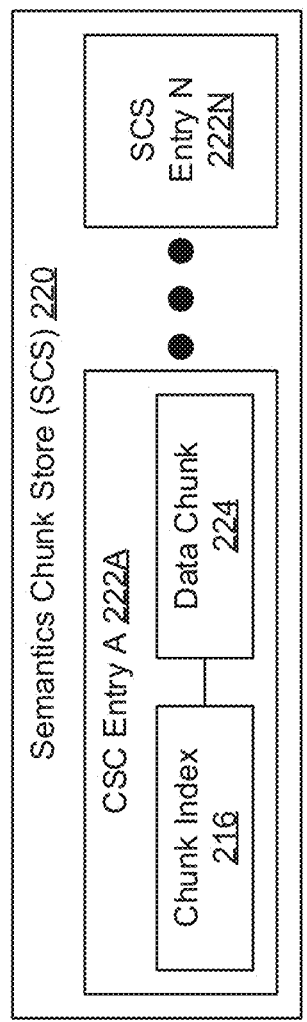
FIG. 2C shows a semantics chunk store in accordance with one or more embodiments of the invention.

FIG. 2C shows a semantics chunk store (SCS) in accordance with one or more embodiments of the invention. The SCS (220) may be repository that consolidates and maintains one or more SCS entries (222A-222N). Each SCS entry (222A-222N) may store a mapping relating a chunk index (216) (described above) to a data chunk (224). Furthermore, the SCS (220) may be programmed by the SSA (see e.g., FIG. 1) during data deduplication operations.

In one embodiment of the invention, a data chunk (224) may be a fragment of any raw data (i.e., a binary information fragment) specified in a data object. Further, the data chunk (224) may be a unique bit or byte pattern that may or may not be identified repeatedly (i.e., more than once) throughout a data copy set (DCS) (see e.g., FIG. 1), and thus, throughout one or more data objects. In one embodiment of the invention, the size of each data chunk (224) may be determined by the data deduplication algorithm applied during data deduplication operations, and may be specified in, for example, kilobytes (KB) or megabytes (MB).

Figure 3:
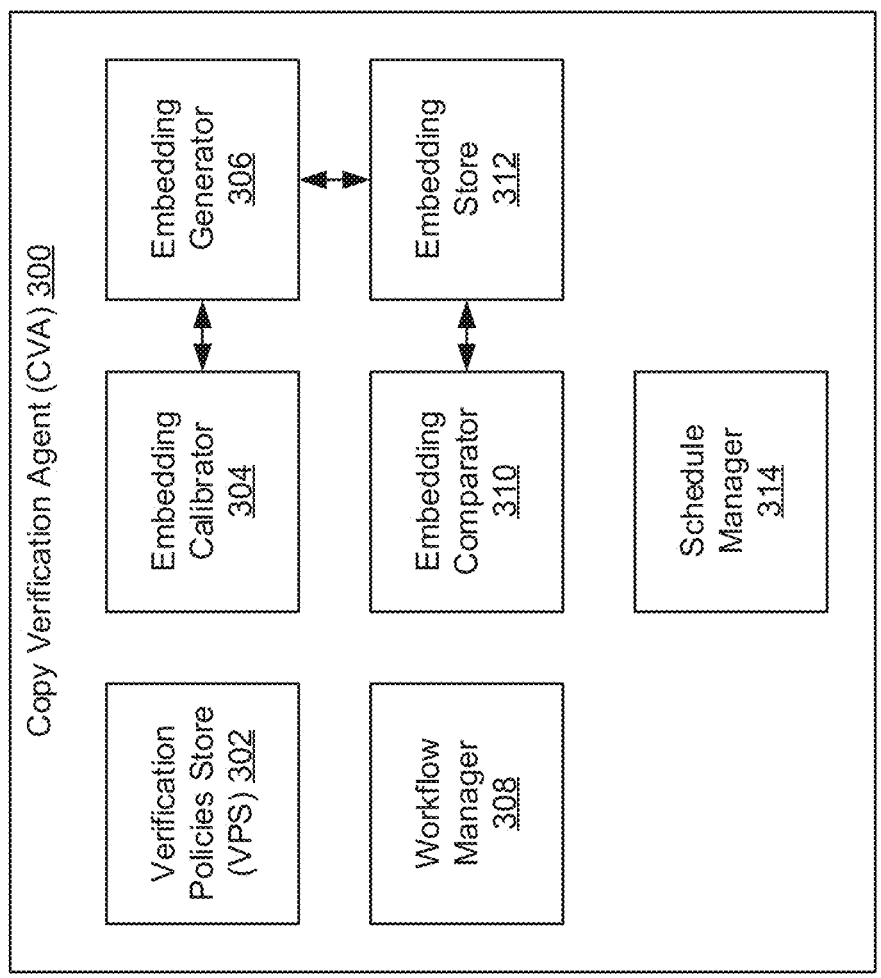
FIG. 3 shows a copy verification agent in accordance with one or more embodiments of the invention.

FIG. 3 shows a copy verification agent (CVA) in accordance with one or more embodiments of the invention. As described above, the CVA (300) may be a computer program or process tasked with the verification of data copies. Further, the CVA (300) may include a verification policies store (VPS) (302), an embedding calibrator (304), an embedding generator (306), a workflow manager (308), an embedding comparator (310), an embedding store (312), and a schedule manager (314). Each of these components is described below.

In one embodiment of the invention, the VPS (302) may be a data repository dedicated for the consolidation of one or more verification policies. Each verification policy of the one or more verification policies consolidated in the VPS may be associated with one data copy set (DCS) (see e.g., FIG. 1) of the one or more DCSs the CVA (300) may be programmed to verify. Further, a verification policy may be a set of guidelines to which the process of verifying the data copies (i.e., the one or more original data set (ODS) copies), of an associated DCS, conforms. Verification policies are described in further detail below with respect to FIG. 4.

In one embodiment of the invention, the embedding calibrator (304) may be a computer process (i.e., an instance of a computer program, or the CVA (300)) that executes on the underlying hardware of the data backup system (DBS) (see e.g., FIG. 1). In another embodiment of the invention, the embedding calibrator (304) may be a computer process that executes on the underlying hardware of a computing system external, however, operatively connected, to the DBS. Specifically, the embedding calibrator (304) may be a computer process tasked with calibrating similarity measures between pairs of copy embeddings (described below) to generate a similarity measure threshold (SMT). A similarity measure may be a measure of the alikeness of two copy embeddings. Further, the SMT may be a limit defining an accepted tolerance of dissimilarity amongst data copies (i.e., ODS copies) of an associated DCS. Said another way, the SMT may be a limit defining an acceptable tolerance for the extent of data infection/corruption, if any, present across the data copies of the DCS. Moreover, the embedding calibrator (304) may include functionality to perform the various steps towards generating the SMT in accordance with embodiments of the invention (see e.g., FIGS. 8A-8C).

In one embodiment of the invention, the embedding generator (306) may be a computer process (i.e., an instance of a computer program, or the CVA (300)) that executes on the underlying hardware of the DBS (see e.g., FIG. 1). In another embodiment of the invention, the embedding generator (306) may be a computer process that executes on the underlying hardware of a computing system external, however, operatively connected, to the DBS. Specifically, the embedding generator (306) may be a computer process tasked with generating copy embeddings for data copies (i.e., ODS copies) in/of a DCS, respectively. A copy embedding may be a multi-dimensional vector that encodes the one or more underlying digital signatures representative of the raw data specified in a corresponding ODS copy. Furthermore, the embedding generator (306) may include functionality to perform the various steps towards generating one or more copy embeddings in accordance with embodiments of the invention (see e.g., FIG. 6).

In one embodiment of the invention, the workflow manager (308) may be a computer process (i.e., an instance of a computer program, or the CVA (300)) that executes on the underlying hardware of the DBS (see e.g., FIG. 1). In another embodiment of the invention, the workflow manager (308) may be a computer process that executes on the underlying hardware of a computing system external, however, operatively connected, to the DBS. Specifically, the workflow manager (308) may be a computer process tasked with coordinating processes (i.e., tasks) for which one or more components of the CVA (300) may be responsible to implement the automation of data copies verification. In one embodiment of the invention, the workflow manager (308) may rely on one or more workflows and/or one or more actions, specified in verification policies (see e.g., FIG. 4), to perform the aforementioned coordination of processes.

In one embodiment of the invention, the embedding comparator (310) may be a computer process (i.e., an instance of a computer program, or the CVA (300)) that executes on the underlying hardware of the DBS (see e.g., FIG. 1). In another embodiment of the invention, the embedding comparator (310) may be a computer process that executes on the underlying hardware of a computing system external, however, operatively connected, to the DBS. Specifically, the embedding comparator (310) may be a computer process tasked with generating similarity measures. As described above, a similarity measure may be a measure of the alikeness of two copy embeddings. Further, to generate a similarity measure, the embedding comparator (310) may include functionality to: (i) project the corresponding pair of copy embeddings into a multi-dimensional space, where, for example, a linear or non-linear mapping function may be employed to translate each copy embedding into a higher dimensional coordinate space; and (ii) compute the Euclidean distance (with dimensions representing features of the copy embeddings) between the pair of multi-dimensionally projected copy embeddings. In other embodiments of the invention, other distance definitions may alternatively be employed, which include, but are not limited to, the Chebyshev distance, the Hamming distance, the Mahalanobis distance, the Manhattan distance, and the Minkowski distance. In one or more other embodiments of the invention, the cosine similarity metric, which measures similarity based on the angle between vectors representing the multi-dimensionally projected pair of copy embeddings, may be employed in place of computing a distance.

In one embodiment of the invention, the embedding store (312) may be data repository dedicated for the consolidation of one or more copy embeddings. Specifically, subsequent to the generation of one or more copy embeddings by the embedding generator (306), the one or more copy embeddings may be stored in the embedding store (312), where the copy embeddings may be accessible to one or more other CVA (300) components (e.g., embedding comparator (310)).

In one embodiment of the invention, the schedule manager (314) may be a computer process (i.e., an instance of a computer program, or the CVA (300)) that executes on the underlying hardware of the DBS (see e.g., FIG. 1). In another embodiment of the invention, the schedule manager (314) may be a computer process that executes on the underlying hardware of a computing system external, however, operatively connected, to the DBS. Specifically, the schedule manager (314) may be a computer process tasked with triggering the execution of the verification process (see e.g., FIGS. 5A and 5B) based on a preset execution schedule defined for each DCS residing on the DBS.

Figure 4:
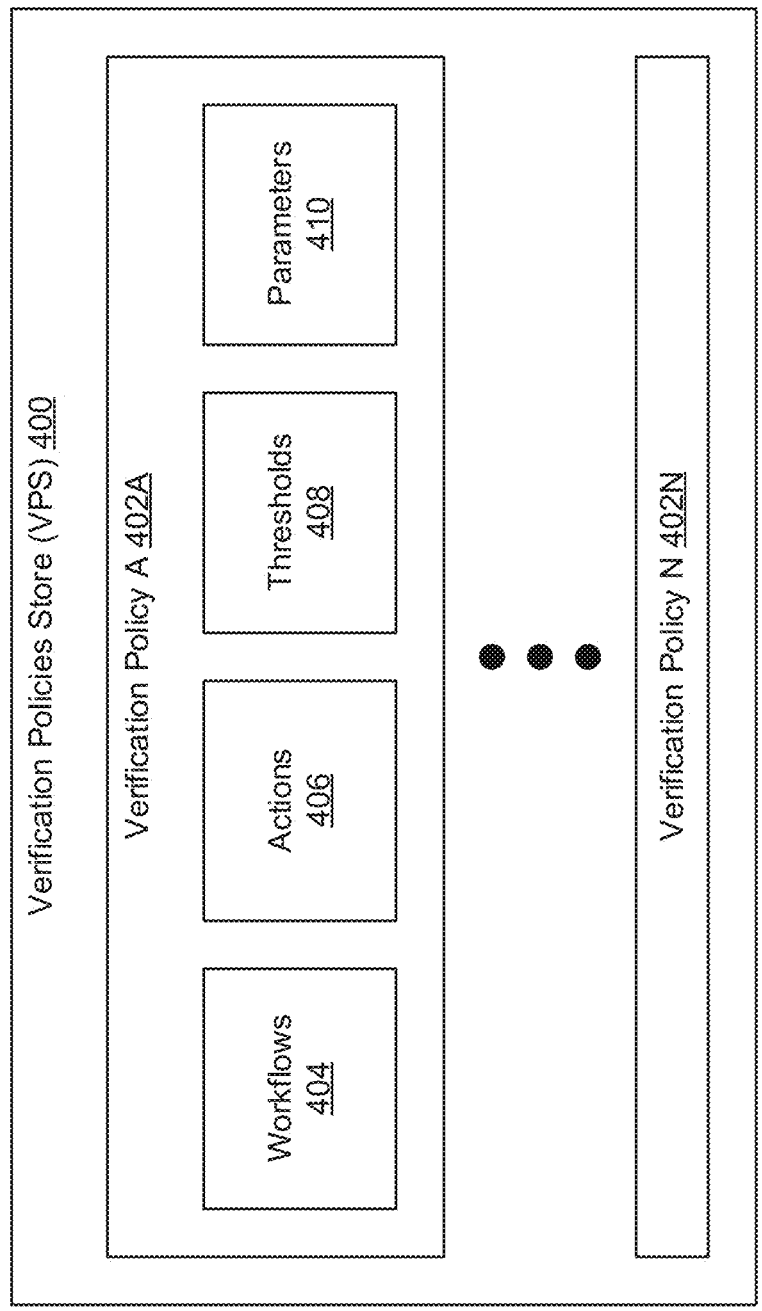
FIG. 4 shows a verification policies store in accordance with one or more embodiments of the invention.

FIG. 4 shows a verification policies store (VPS) in accordance with one or more embodiments of the invention. As described above, the VPS (400) may be a data repository dedicated for the consolidation of one or more verification policies (402A-402N). Each verification policy (402A-402N) may be associated with one data copy set (DCS) (see e.g., FIG. 1) of the one or more DCSs that may undergo data copies verification in accordance with embodiments of the invention (see e.g., FIGS. 5A and 5B). Further, a verification policy may be a set of guidelines to which the process of verifying the data copies (i.e., the one or more original data set (ODS) copies), of an associated DCS, conforms. The aforementioned set of guidelines for an associated DCS may be represented through one or more workflows (404), one or more actions (406), one or more thresholds (408), and one or more parameters (410). Each of these components is described below.

In one embodiment of the invention, a workflow (404) may be an orchestrated set of processes (i.e., tasks, responsibilities, activities, etc.) that outline the execution of at least a portion of one or more embodiments of the invention (see e.g., FIGS. 5A, 5B, 6, and 8A-8C) in conformance with an appropriate sequencing order. In one embodiment of the invention, a workflow (404) may be a computer readable program code script expressed in any computer readable programming language, which implements the automation of data copies verification according to embodiments of the invention. In one embodiment of the invention, a workflow (404) may specify the performance of one or more processes based on monitored status and/or conditions. For example, a workflow (404) may specify that one or more actions (406), also specified in the verification policy (402A-402N) for an associated DCS (not shown), is/are to be triggered should at least one ODS copy in/of the associated DCS include some data infection or corruption, where the extent of the data infection/corruption exceeds acceptable tolerances (i.e., exceeds a similarity measure threshold (SMT).

In one embodiment of the invention, an action (406) may be a response (i.e., the performance of a process) triggered based on one or more monitored statuses or conditions (mentioned above). By way of examples, an action (406) may include, but is not limited to: (i) the issuance of a notification relaying the state of a monitored status or condition at the given time the action (406) is triggered; (ii) the marking of one or more vetted (i.e., verified) ODS copies in/of an associated DCS as immutable; (iii) the replication of one or more vetted or verified ODS copies in/of an associated DCS to an additional storage system operatively connected to the data backup system (DBS) (see e.g., FIG. 1); (iv) the submission of one or more compromised ODS copies for additional, more intensive data integrity inspections; (v) the powering down of the DBS; and (vi) the disabling of one or more network interfaces/ports of the DBS, thereby isolating the DBS and preventing the spread of data infection/corruption to other components of a system (e.g., one or more client computing systems (CCSs) (see e.g., FIG. 1)).

In one embodiment of the invention, a threshold (408) may be a limit defining a property or aspect of the DCS with which the verification policy (402A-402N) is associated. By way of an example, a threshold (408) may be the similarity measure threshold (SMT). The SMT may be a limit defining an accepted tolerance of dissimilarity amongst data copies (i.e., ODS copies) of an associated DCS. Said another way, the SMT may be a limit defining an acceptable tolerance for the extent of data infection/corruption, if any, present across the data copies of the DCS associated with the verification policy (402A-402N).

In one embodiment of the invention, a parameter may be a numerical or other measurable factor that defines an operation of the data copies verification process (see e.g., FIGS. 5A, 5B, 6, and 8A-8C). Examples of parameters include, but are not limited to, an embedding percent change (EPC) parameter and an embedding calibration iterations (ECI) parameter. In one embodiment of the invention, the EPC parameter may be a numerical factor specifying the percentage of total raw data representing a temporary ODS copy (TOC) (see e.g., FIGS. 8A-8C) that should be modified to simulate compromised data integrity (e.g., data infection/corruption) caused, for example, by unauthorized modifications to data copies made by one or more cyber security attacks/threats. In one embodiment of the invention, the ECI parameter may be a numerical factor specifying the total number of calibration iterations (described below) should be performed to calibrate similarity measures between pairs of copy embeddings, thereby, arriving at a best fit similarity measure threshold (SMT).

Figure 5A:
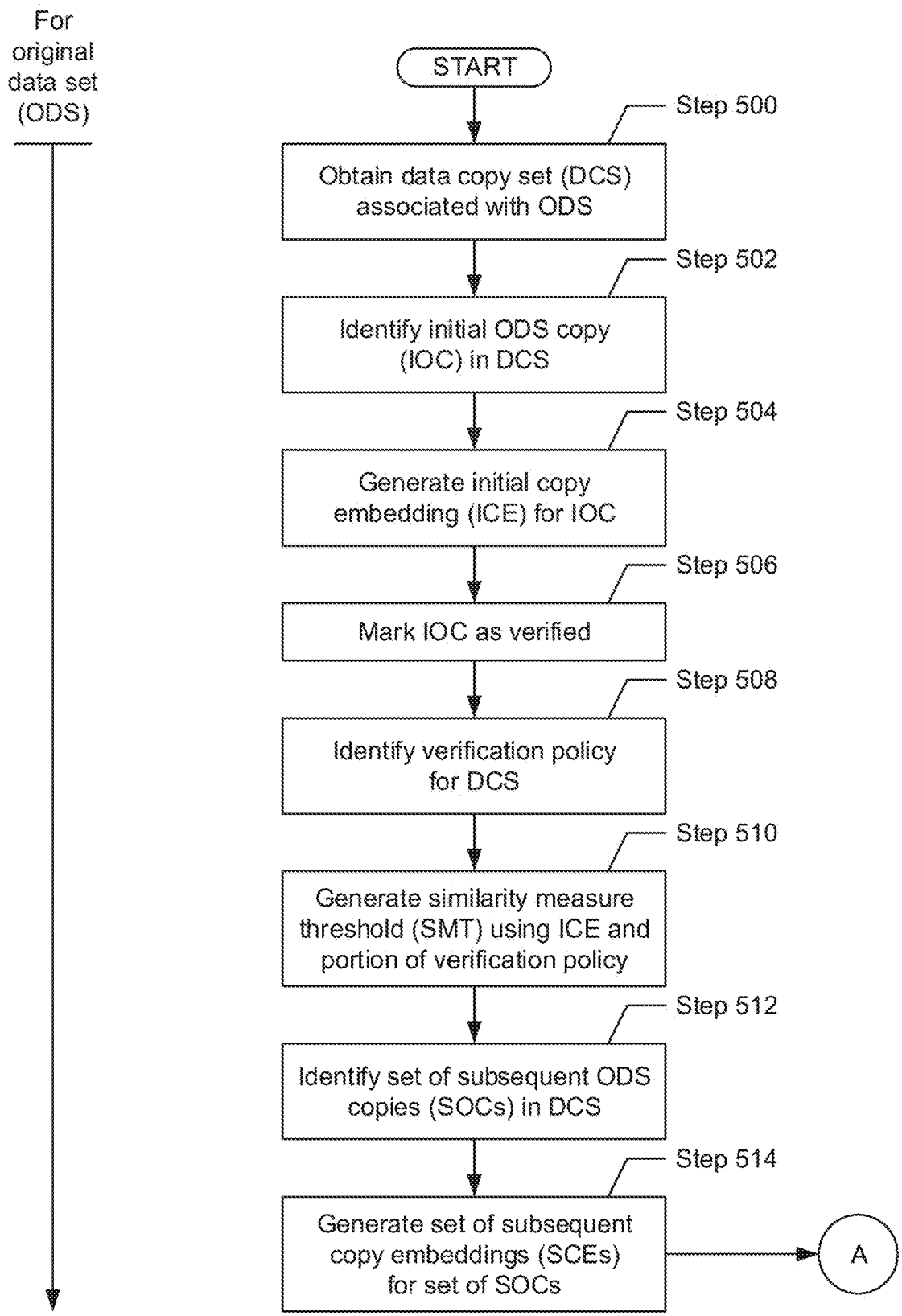
FIGS. 5A and 5B show flowcharts describing a method for verifying data copies in accordance with one or more embodiments of the invention.
Figure 5B:
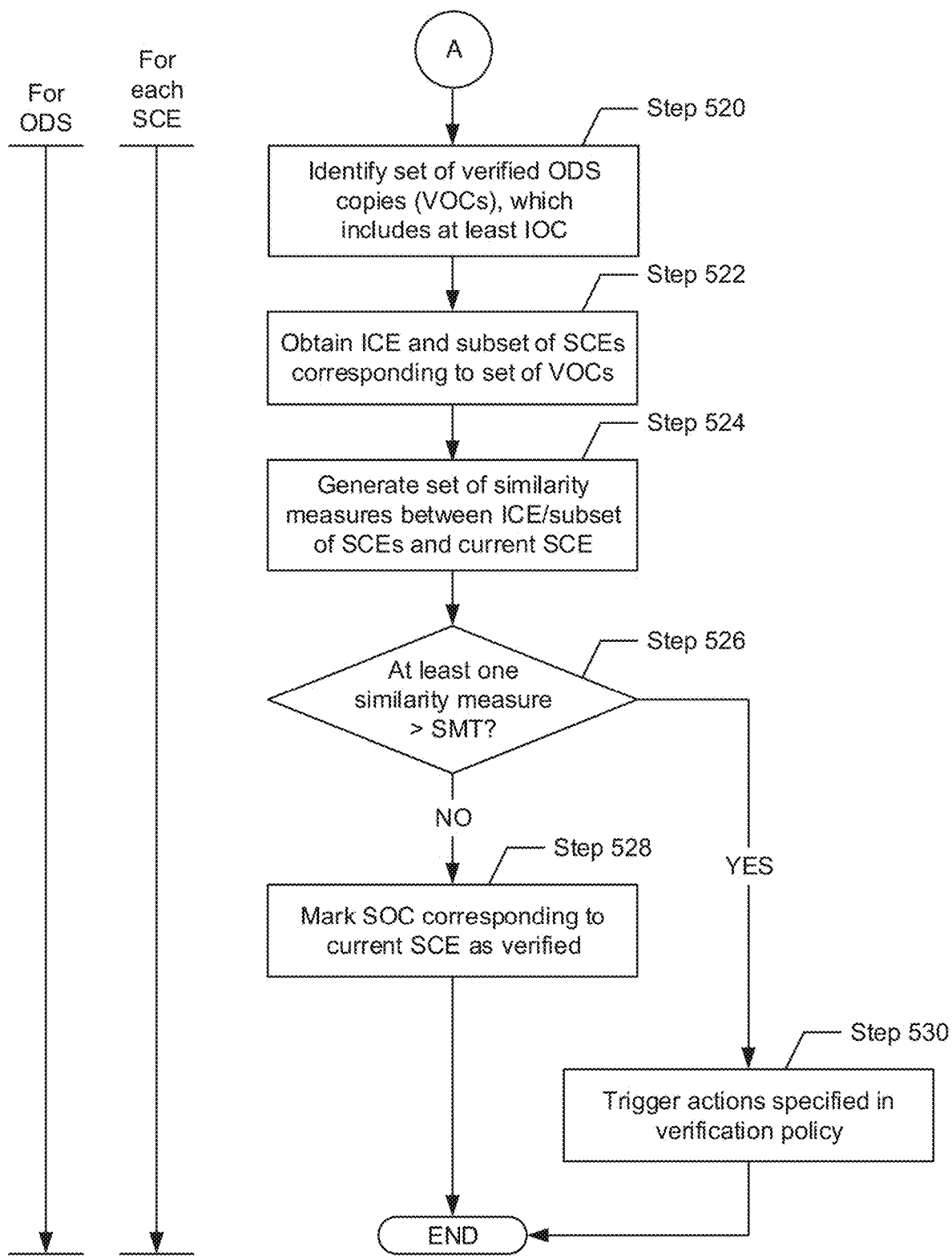

FIGS. 5A and 5B show flowcharts describing a method for verifying data copies in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 5A and 5B may be performed in parallel with any other steps shown in FIGS. 6 and 8A-8C without departing from the scope of the invention.

Turning to FIG. 5A, in Step 500, for an original data set (ODS) (see e.g., FIG. 1), the data copy set (DCS) associated with the ODS is obtained. In one embodiment of the invention, the DCS may be retrieved from a data repository residing on a data backup system (DBS) (see e.g., FIG. 1). Further, the DCS may include a set of at least two ODS copies, where each ODS copy may be an exact copy of the ODS at a given time.

In Step 502, an initial ODS copy (IOC) of the DCS (obtained in Step 500) is identified. In one embodiment of the invention, the IOC may refer to the first ODS copy, or the ODS copy associated with the earliest given time, specified in the DCS. Subsequently, identification of the IOC may entail, for example, sorting the set of ODS copies specified in the DCS by creation date (i.e., earliest to most recent) and identifying the topmost (i.e., earliest) ODS copy as the IOC.

In Step 504, an initial copy embedding (ICE) for the IOC (identified in Step 502) is generated. In one embodiment of the invention, the ICE may be a multi-dimensional vector that encodes the one or more underlying digital signatures representative of the raw data specified in the IOC (post data deduplication). Further, the ICE differs from the underlying digital signature(s) that which the ICE encodes in the sense that the ICE may be compared with other copy embeddings (corresponding to other ODS copies in the DCS) to determine similarity. Generation of a copy embedding (e.g., the ICE) is described in further detail below with respect to FIG. 6.

In Step 506, after generating the ICE (in Step 504), the IOC (identified in Step 502) is marked as verified. In one embodiment of the invention, marking the IOC as verified may, for example, entail modifying a metadata parameter associated with the IOC from an unverified state to a verified state. In such an embodiment, the unverified state of an ODS copy (e.g., the IOC) may be indicative that the ODS copy has yet to be assessed for the presence of data infection or corruption. Alternatively, the verified state of an ODS copy (e.g., the IOC) may be indicative that the ODS copy has undergone data integrity assessment, and may or may not include some data infection or corruption, where the extent of the data infection/corruption, if any, is within acceptable tolerances (i.e., within a similarity measure threshold (SMT) (described below)).

In Step 508, a verification policy for the DCS (obtained in Step 500) is identified. In one embodiment of the invention, a verification policy may be a set of guidelines to which the process of verifying the data copies (i.e., ODS copies), of an associated DCS, conforms. Further, the set of guidelines in the verification policy may take the form of one or more workflows, actions, thresholds, and/or parameters (described above) (see e.g., FIG. 4). Moreover, the verification policy for the DCS may be identified from a set of verification policies, corresponding to a set of DCSs, consolidated in a verification policies store (VPS) residing in the copy verification agent (CVA) (see e.g., FIGS. 1 and 3).

In Step 510, a similarity measure threshold (SMT) for the DCS (obtained in Step 500) is generated. In one embodiment of the invention, the SMT may be a limit defining an accepted tolerance of dissimilarity amongst data copies (i.e., ODS copies) of the DCS. Said another way, the SMT may be a limit defining an acceptable tolerance for the extent of data infection/corruption, if any, present across the data copies of the DCS. Further, the SMT may be generated using the ICE (generated in Step 504) and at least a portion of the verification policy (identified in Step 508). Generation of the SMT is described in further detail below with respect to FIGS. 8A-8C.

In Step 512, a set of one or more subsequent ODS copies (SOCs) of the DCS (obtained in Step 500) is identified. In one embodiment of the invention, a SOC may refer to any ODS copy of the DCS that is not the IOC. That is, a SOC may be any other ODS copy that is not the first ODS copy (e.g., the ODS copy associated with the earliest given time). Identification of set of SOCs may entail, for example, sorting the set of ODS copies specified in the DCS by creation date (i.e., earliest to most recent) and identifying the subset of ODS copies, excluding the topmost (i.e., earliest) ODS copy, as the set of SOCs.

In Step 514, a set of one or more subsequent copy embeddings (SCEs) for the set of SOCs (identified in Step 512) is generated. In one embodiment of the invention, each SCE may be a multi-dimensional vector that encodes the one or more underlying digital signatures representative of the raw data specified in a corresponding SOC (post data deduplication). Further, a SCE differs from the underlying digital signature(s) of that which the SCE encodes in the sense that the SCE may be compared with other copy embeddings (corresponding to other ODS copies in the DCS) to determine similarity. Generation of a copy embedding (e.g., each SCE) is described in further detail below with respect to FIG. 6.

Turning to FIG. 5B, in Step 520, for each SCE (generated in Step 514), a set of verified ODS copies (VOCs) is identified. In one embodiment of the invention, the set of VOCs may include at least one ODS copy of the DCS (obtained in Step 500) that has been previously vetted (i.e., marked as verified) by the verification process. For example, when assessing a second ODS copy (i.e., an ODS copy associated with the second earliest given time (e.g., creation date)), the set of VOCs may only include the IOC—i.e., the only ODS copy that had been previously vetted by the verification process. Accordingly, when assessing a Nth ODS copy (i.e., an ODS copy associated with the Nth earliest given time (e.g., creation date)), the set of VOCs may include at least the IOC, if not one or more other ODS copies (up to the (N−1)th ODS copy), which have been vetted by the verification process.

In Step 522, a subset of the set of SCEs (generated in Step 514) is obtained. In one embodiment of the invention, the subset of SCEs may at least exclude the current SCE corresponding to a current SOC being verified. Further, the subset of SCEs may include the corresponding SCE for each VOC (excluding the IOC) in the set of VOCs (identified in Step 520). In one embodiment of the invention, the ICE corresponding to the IOC (generated in Step 504) is also obtained.

In Step 524, a set of similarity measures is generated. In one embodiment of the invention, a similarity measure may be a measure of the alikeness of two copy embeddings (e.g., between the current SCE and the ICE or between the current SCE and another SCE in the subset of SCEs). Further, generation of each similarity measure may entail: (i) projecting the corresponding pair of copy embeddings into a multi-dimensional space, where, for example, a non-linear or linear mapping function may be employed to translate each copy embedding into a higher dimensional coordinate space; and (ii) computing the Euclidean distance (with dimensions representing features of the copy embeddings) between the pair of multi-dimensionally projected copy embeddings. In other embodiments of the invention, other distance definitions may alternatively be employed, which include, but are not limited to, the Chebyshev distance, the Hamming distance, the Mahalanobis distance, the Manhattan distance, and the Minkowski distance. In one or more other embodiments of the invention, the cosine similarity metric, which measures similarity based on the angle between vectors representing the multi-dimensionally projected pair of copy embeddings, may be employed in place of computing a distance.

In Step 526, in one embodiment of the invention, a determination is made as to whether at least one similarity measure of the set of similarity measures (generated in Step 524) for the current SCE exceeds the SMT (generated in Step 510). If it is determined that at least one similarity measure exceeds the SMT, then the current SOC being verified (corresponding to the current SCE) may include data infection/corruption beyond an accepted tolerance level, and thus, the process proceeds to Step 530. On the other hand, if it is alternatively determined that none of the similarity measures exceeds the SMT (i.e., all of the similarity measures falls short of the SMT), then the current SOC being verified (corresponding to the current SCE) may or may not include data infection/corruption, where the extent of the data infection/corruption, if any, is within an accepted tolerance level. Subsequently, based on this determination, the process proceeds to Step 528.

In another embodiment of the invention, an alternative determination may be made, in Step 526, as to whether all similarity measures of the set of similarity measures (generated in Step 524) for the current SCE exceeds the SMT (generated in Step 510). Accordingly, if it is determined that each and every similarity measure in the set of similarity measures exceeds the SMT, then the process proceeds to Step 530. On the other hand, if it is alternatively determined that at least one similarity measure of the set of similarity measures does not exceed the SMT, the process proceeds to Step 528.

In yet another embodiment of the invention, an alternative determination may be made, in Step 526, as to whether a mean similarity measure (i.e., a similarity measure representing an average of the set of similarity measures for the current SCE) exceeds the SMT (generated in Step 510). Accordingly, if it is determined that the mean similarity measure exceeds the SMT, the process proceeds to Step 530. On the other hand, if it is alternatively determined that the mean similarity measure does not exceed the SMT, the process proceeds to Step 528.

Other criteria relating the set of similarity measures (generated in Step 524) for the current SCE and the SMT (generated in Step 510) may be used without departing from the scope of the invention.

In Step 528, after determining (in Step 526) that at least one similarity measure (or, alternatively, a mean similarity measure) exceeds the SMT (generated in Step 510), the current SOC being verified (corresponding to the current SCE) is marked as verified. In one embodiment of the invention, marking the current SOC as verified may, for example, entail modifying a metadata parameter associated with the current SOC from an unverified state to a verified state. In such an embodiment, the unverified state of an ODS copy (e.g., the current SOC) may be indicative that the ODS copy has yet to be assessed for the presence of data infection or corruption. Alternatively, the verified state of an ODS copy (e.g., the current SOC) may be indicative that the ODS copy has undergone data integrity assessment, and may or may not include some data infection or corruption, where the extent of the data infection/corruption, if any, is within acceptable tolerances (i.e., within the SMT). Thereafter, Steps 520 through 530 may be revisited for the next SCE, if any, in the set of SCEs (generated in Step 514).

In Step 530, after alternatively determining (in Step 526) that none of the similarity measures exceeds (or, alternatively, the mean similarity measure does not exceed) the SMT (generated in Step 510), one or more actions (described above) (see e.g., FIG. 4) specified in the verification policy for the DCS (obtained in Step 500) is/are triggered. Thereafter, Steps 520 through 530 may not be revisited for the remaining SCEs, if any, in the set of SCEs (generated in Step 514).

Figure 6:
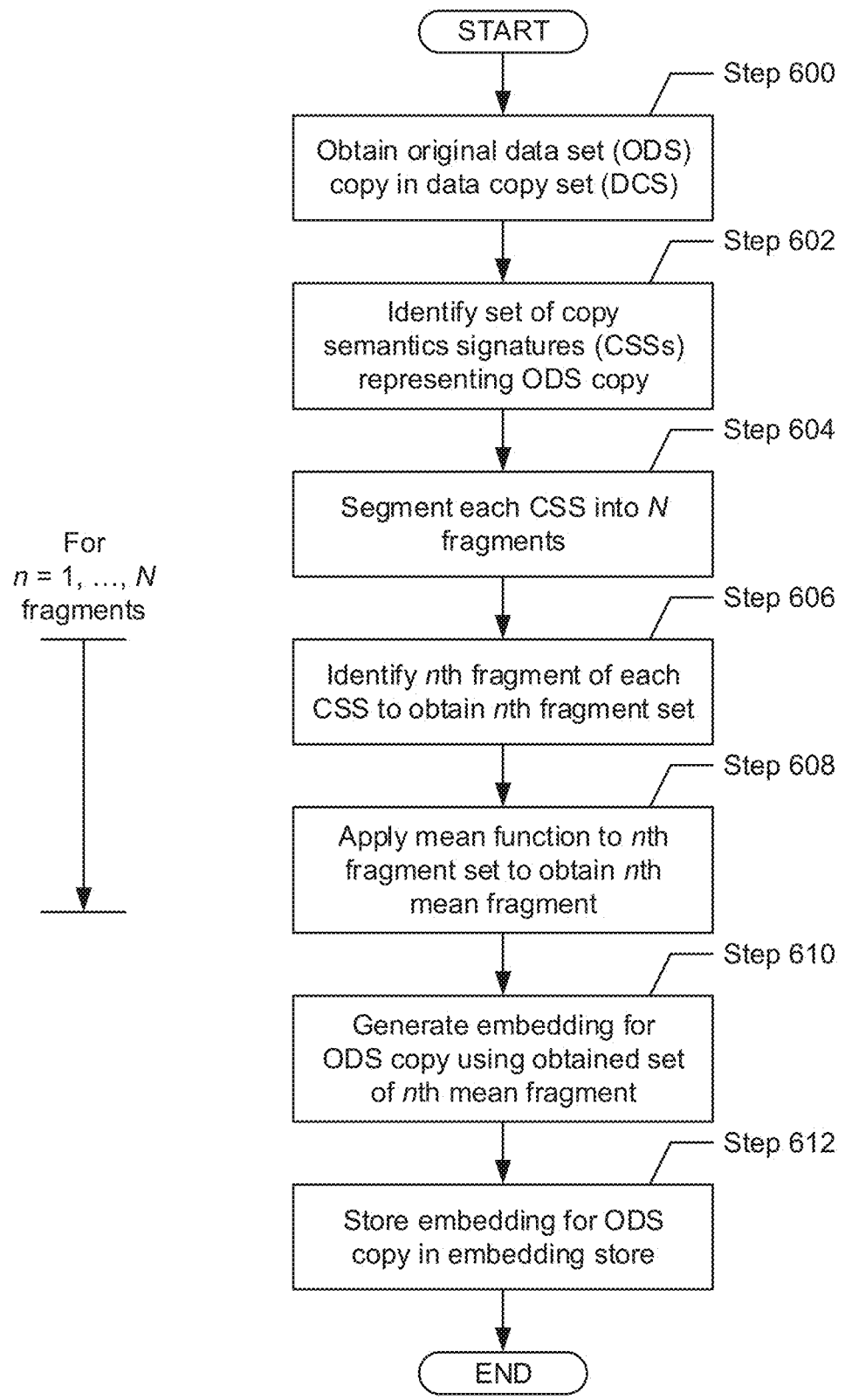
FIG. 6 shows a flowchart describing a method for generating a copy embedding in accordance with one or more embodiments of the invention.

FIG. 6 shows a flowchart describing a method for generating a copy embedding in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIG. 6 may be performed in parallel with any other steps shown in FIGS. 5A, 5B, and 8A-8C without departing from the scope of the invention.

Turning to FIG. 6, in Step 600, an original data set (ODS) copy in/of a data copy set (DCS) (see e.g., FIG. 1) is obtained. In one embodiment of the invention, the ODS copy may be an initial ODS copy (IOC) (described above) or a subsequent ODS copy (SOC) (also described above) (see e.g., FIGS. 5A and 5B) in/of the DCS. Further, the ODS copy may be an ODS copy previously subjected to data deduplication. That is, rather than specifying raw data, the ODS copy may alternatively specify a sequence of one or more signature indices (see e.g., FIG. 2A), which may or may not repeat, representing unique data chunks identified throughout the raw data.

In Step 602, a set of one or more copy semantics signatures (CSSs) representing the ODS copy (obtained in Step 600) is identified. In one embodiment of the invention, as mentioned above, the ODS copy may specify a sequence of one or more signature indices (see e.g., FIG. 2A). Each signature index may be a referencing object that contains a memory address to a semantics signature store (SSS) entry consolidated in the SSS residing as a portion of storage semantics metadata (SSM) in the DBS data repository (see e.g., FIG. 1). Further, for each signature index specified in the ODS copy, a corresponding digital signature (i.e., CSS) may be identified/obtained from the corresponding SSS entry referenced by the signature index (see e.g., FIG. 2B).

In Step 604, each CSS of the set of CSSs (identified in Step 602) for the ODS copy (obtained in Step 600) is segmented. Specifically, in one embodiment of the invention, each CSS may be segmented into multiple fragments. In one embodiment of the invention, each fragment may be one-byte long. Further, because each CSS may be of a same specified length size (e.g., 20 bytes long), the number of fragments segmented from each CSS would be the same. In other embodiments of the invention, each CSS may alternatively be segmented into multiple fragments of other specified length sizes.

Figure 7:
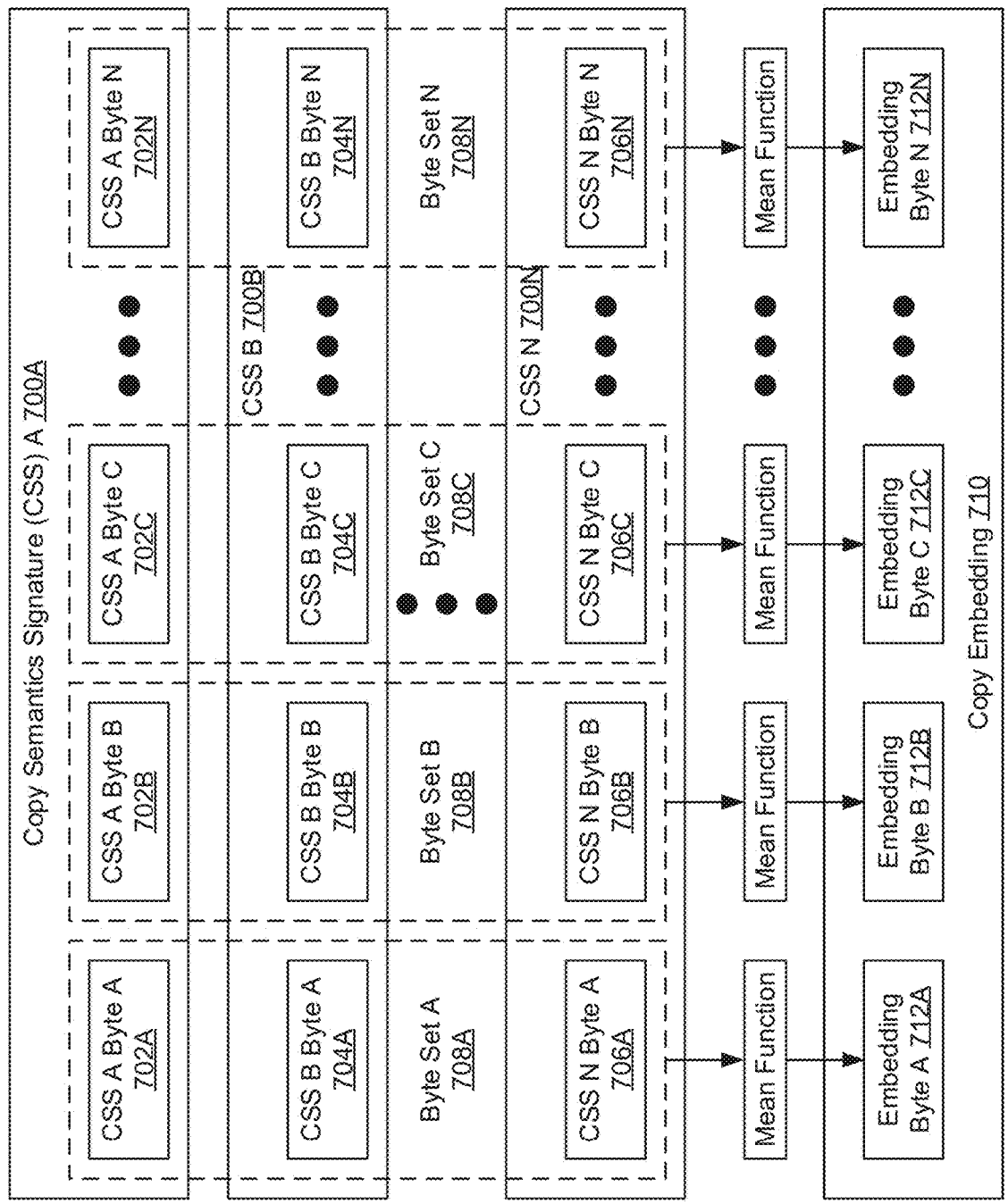
FIG. 7 shows a non-limiting example of copy embedding generation in accordance with one or more embodiments of the invention.

In Step 606, for each CSS of the set of CSSs (identified in Step 602), the nth fragment of the CSS (segmented from the CSS in Step 604), where n=1, . . . , N fragments into which the CSS was segmented, is identified. In one embodiment of the invention, in performing Step 606 for each CSS, a nth fragment set may be obtained, where the nth fragment set may include the nth fragment segmented from each CSS of the set of CSSs. For example, a first fragment set may include a first fragment segmented from each CSS of the set of CSSs (i.e., the first fragment of a first CSS, the first fragment of a second CSS, the first fragment of a third CSS, and so on). By way of another example, a tenth fragment set may include the tenth fragment segmented from each CSS of the set of CSSs (i.e., the tenth fragment of a first CSS, the tenth fragment of a second CSS, the tenth fragment of a third CSS, and so on). An example conforming to Step 606, in part, is depicted in FIG. 7.

In Step 608, for each nth fragment set (obtained in Step 606), an nth mean fragment is obtained. Specifically, in one embodiment of the invention, a mean function may be applied to each nth fragment set to obtain a corresponding nth mean fragment. For example, for a first fragment set including the first fragment of a first CSS, the first fragment of a second CSS, the first fragment of a third CSS, an so on, a corresponding first mean fragment may be obtained by computing the mean or average of the first fragments of the first, second, third, etc., CSSs specified in the first fragment set. In other embodiments of the invention, other statistical functions may be employed rather than the mean function such as, for example, a median function, a mode function, a standard deviation function, or a variance function. An example conforming to Step 608, in part, is depicted in FIG. 7.

In Step 610, a copy embedding for the ODS copy (obtained in Step 600) is generated. In one embodiment of the invention, the copy embedding may be a multi-dimensional vector that encodes the one or more underlying digital signatures (i.e., one or more CSSs) representative of the raw data specified in the ODS copy (post data deduplication). Subsequently, in one embodiment of the invention, the copy embedding may be representative of the set of nth mean fragments (obtained in Step 608), which may include the nth mean fragment representing the average of each nth fragment set (obtained in Step 606). An example of a copy embedding generation is illustrated in FIG. 7.

In Step 612, the copy embedding (generated in Step 610) for the ODS copy (obtained in Step 600) is stored. In one embodiment of the invention, the copy embedding may be stored in the embedding store residing within the copy verification agent (CVA) (see e.g., FIG. 3).

FIG. 7 shows a non-limiting example of copy embedding generation in accordance with one or more embodiments of the invention. That is, the following example is for explanatory purposes only and not intended to limit the scope of the invention.

Turning to FIG. 7, following the various steps described above with respect to FIG. 6, copy embedding generation may begin with the identification of one or more copy semantic signatures (CCSs) (700A-700N) that represent a selected original data set (ODS) copy of a data copy set (DCS) (see e.g., FIG. 1). Thereafter, each CSS (700A-700N) may be segmented into multiple fragments of a specified length size (e.g., one-byte long). Further, the CSSs (700A-700N) may be segmented so that each CSS (700A-700N) includes the same number of fragments. For example, following uniformity, a first CSS (700A) may be segmented into N fragments (702A-702N), a second CSS (700B) may be segmented into N fragments (704A-704N), and so on, up to and including a last CSS (700N), which may also be segmented into N fragments (706A-706N).

Thereafter, each nth fragment respective to each CSS (700A-700N), for n=1, N fragments, may be grouped as a corresponding nth fragment set. By way of the example shown in FIG. 7, a first fragment set (708A) may include the first fragments (702A, 704A, 706A) of the first, second, and so on, up to and including the last CSS (700A-700N), respectively. Subsequently, a second fragment set (708B) may include the second fragments (702B, 704B, 706B) of the first, second, and so on, up to and including the last CSS (700A-700N), respectively, and so forth (up to and including a Nth fragment set (708N) including Nth fragments (702N, 704N, 706N) for each of the CSSs (700A-700N), accordingly).

Afterwards, for each obtained nth fragment set (708A-708N), the fragments therein may be subjected through, for example, a mean function to obtain a corresponding nth mean fragment. That is, the first fragments (702A, 704A, 706A) for each CSS (700A-700N), representative of the first fragment set (708A), may be averaged to obtain a first mean fragment (712A). Further, the second fragments (702B, 704B, 706B) for each CSS (700A-700N), representative of the second fragment set (708B), may be averaged to obtain a second mean fragment (712B); and so forth, up to and including the Nth fragments (702N, 704N, 706N) for each CSS (700A-700N), representative of the Nth fragment set (708N), which may be averaged to obtain a Nth mean fragment (712N). Finally, the sequence or set of N mean fragments (712A-712N) may grouped to represent the generated copy embedding (710) for the ODS copy.

Figure 8A:
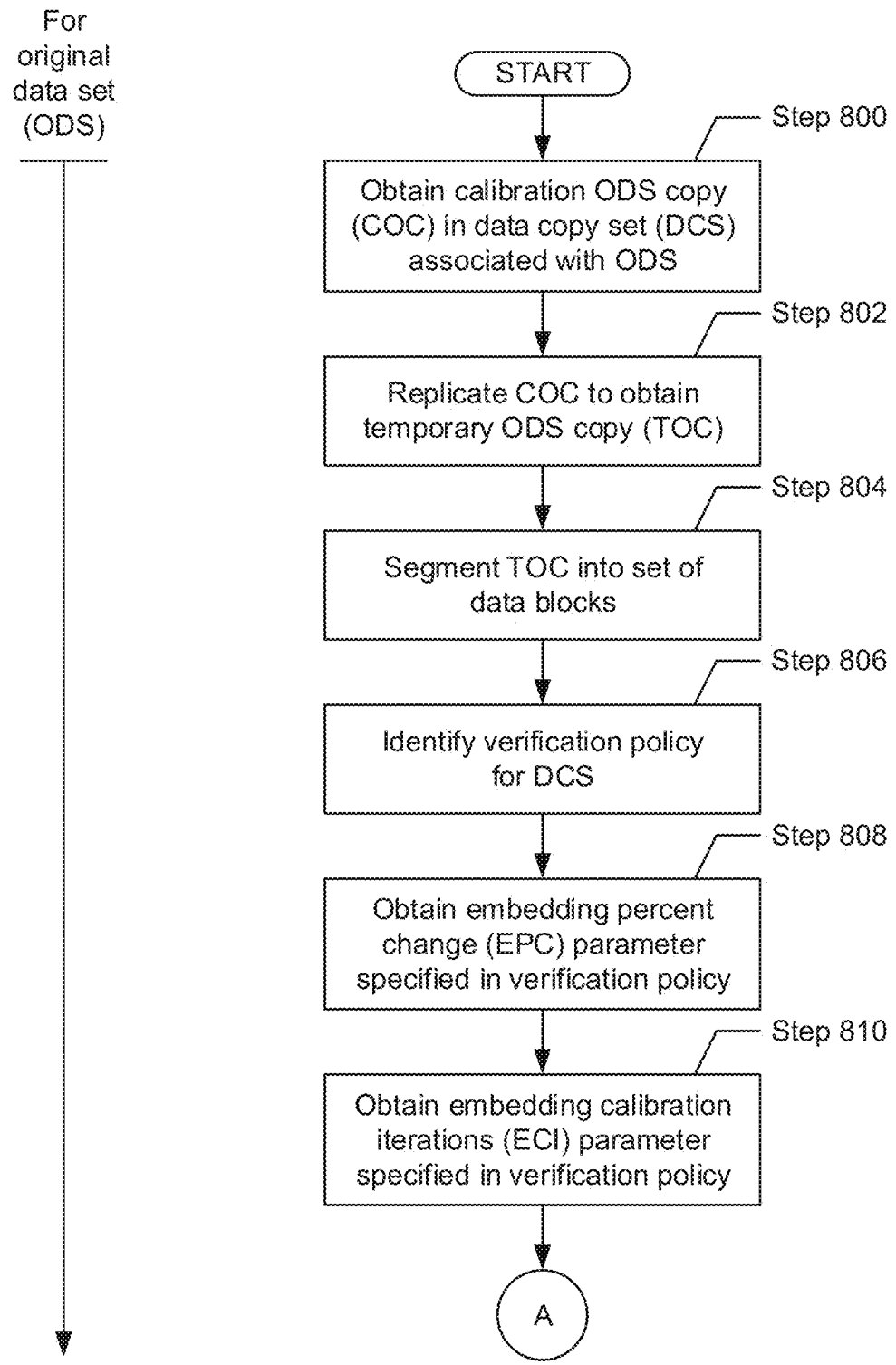
FIGS. 8A-8C show flowcharts describing a method for generating a similarity measure threshold in accordance with one or more embodiments of the invention.
Figure 8B:
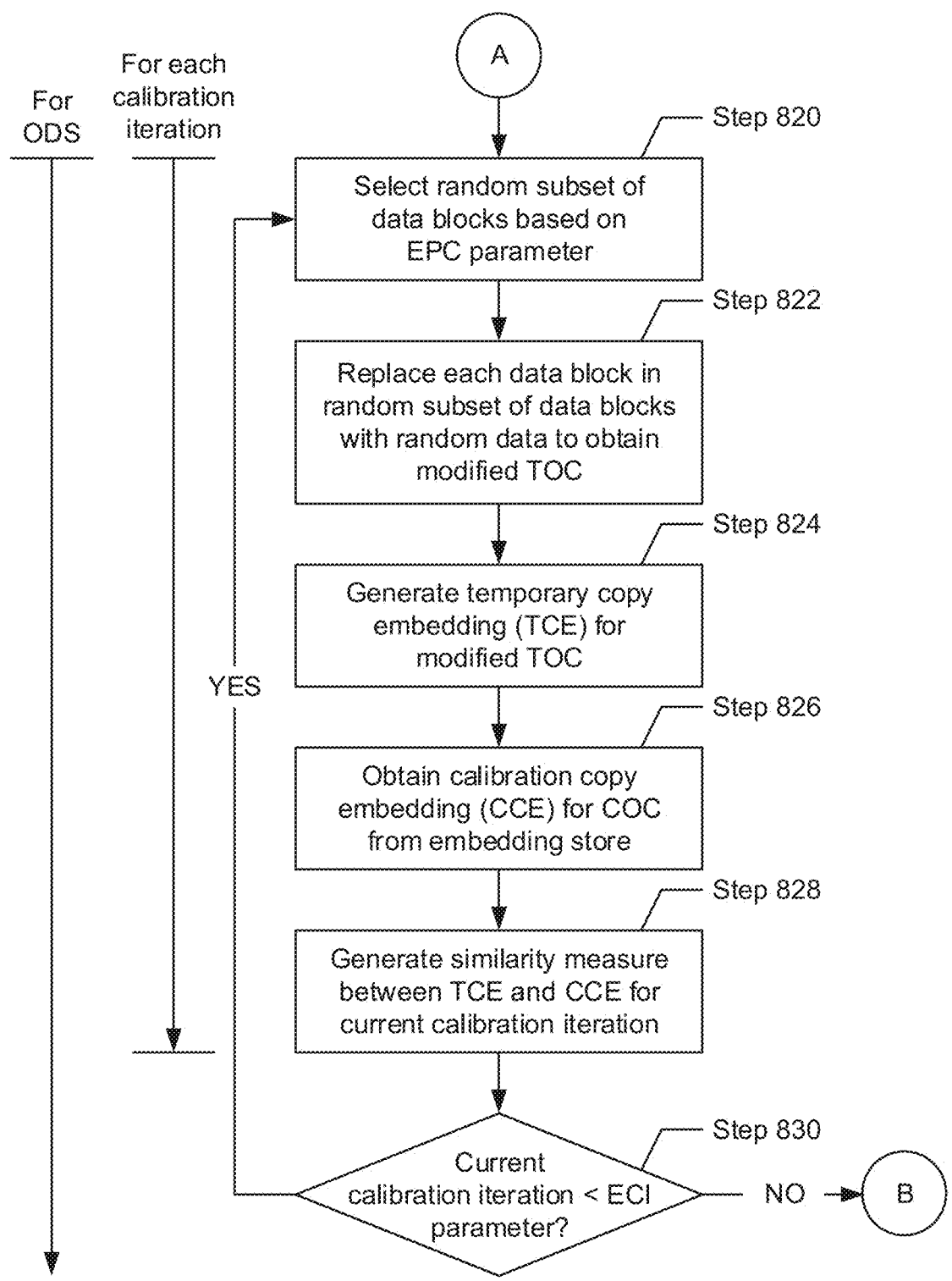
Figure 8C:
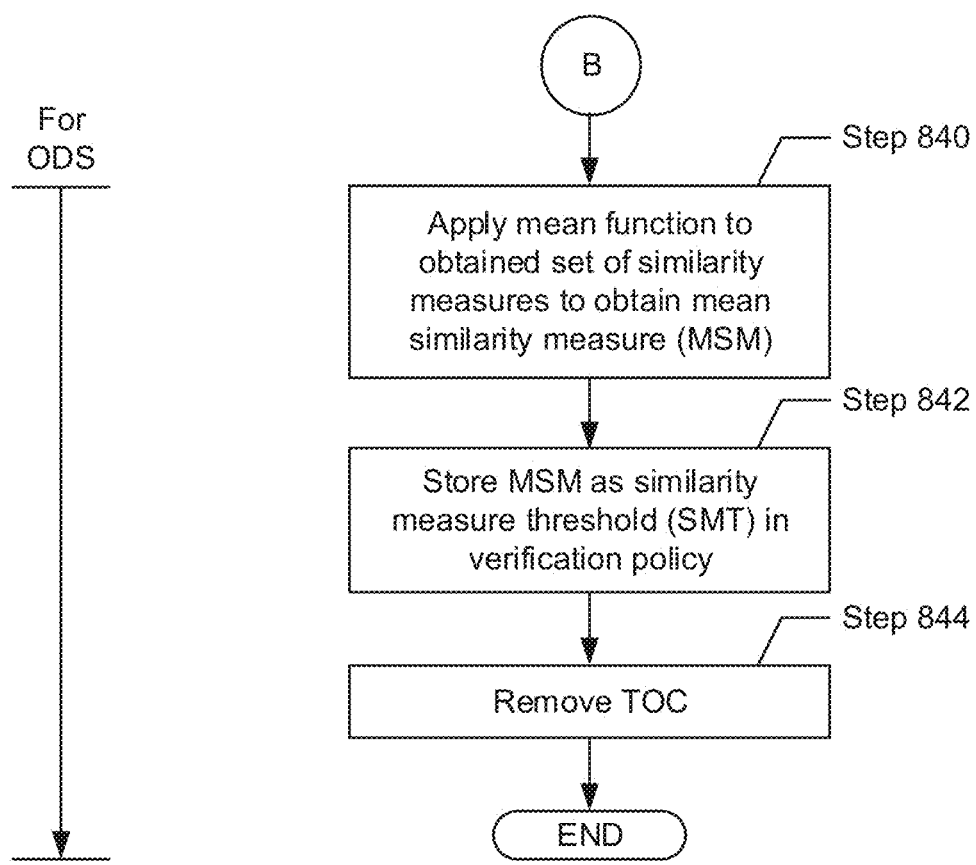

FIGS. 8A-8C show flowcharts describing a method for generating a similarity measure threshold (SMT) in accordance with one or more embodiments of the invention. While the various steps in the flowcharts are presented and described sequentially, one of ordinary skill will appreciate that some or all steps may be executed in parallel. In one embodiment of the invention, the steps shown in FIGS. 8A-8C may be performed in parallel with any other steps shown in FIGS. 5A, 5B, and 6 without departing from the scope of the invention.

Turning to FIG. 8A, in Step 800, for an original data set (ODS) (see e.g., FIG. 1), a calibration ODS copy (COC) in/of the data copy set (DCS) associated with the ODS is obtained. In one embodiment of the invention, the COC may be any ODS copy in/of the DCS that has been previously vetted (i.e., marked as verified) by the verification process (see e.g., FIGS. 5A and 5B). At least, in one embodiment of the invention, the COC may be the initial ODS copy (IOC) (described above) in/of the DCS.

In Step 802, the COC (obtained in Step 800) is replicated. In one embodiment of the invention, the COC may be replicated to obtain a temporary ODS copy (TOC)—i.e., an exact copy of the COC. Generation of the TOC may entail using any existing or future developed data replication algorithm.

In Step 804, the TOC (obtained in Step 802) is segmented. Specifically, in one embodiment of the invention, the TOC may be segmented into multiple (or a set of) data blocks. Each data block may be a fragment of the raw data once specified in the COC (pre-data deduplication). Towards first obtaining the raw data once specified in the COC: (i) one or more chunk indices corresponding to one or more signature indices specified in the TOC (post-data deduplication) is/are obtained using mappings consolidated in the semantics signature store (SSS) (see e.g., FIG. 2B); (ii) one or more data chunks corresponding to the one or more obtained chunk indices is/are retrieved using mappings consolidated in the semantics chunk store (SCS) (see e.g., FIG. 2C); and (iii) the retrieved one or more data chunks, corresponding to the one or more signature indices specified in the TOC, is/are concatenated together according to the sequencing order of the one or more signature indices to restore to TOC to a pre-data deduplication state specifying raw data. Further, in one embodiment of the invention, each data block of the set of data blocks segmented from the raw data may be of any specified length size. By way of an example, the TOC may be segmented into a set of 8 kilobyte (KB) long fragments.

In Step 806, a verification policy for the DCS (mentioned in Step 800) is identified. In one embodiment of the invention, a verification policy may be a set of guidelines to which the process of verifying the data copies (i.e., ODS copies), of an associated DCS, conforms. Further, the set of guidelines in the verification policy may take the form of one or more workflows, actions, thresholds, and/or parameters (described above) (see e.g., FIG. 4). Moreover, the verification policy for the DCS may be identified from a set of verification policies, corresponding to a set of DCSs, consolidated in a verification policies store (VPS) residing in the copy verification agent (CVA) (see e.g., FIGS. 1 and 3).

In Step 808, an embedding percent change (EPC) parameter specified in the verification policy (identified in Step 806) is obtained. In one embodiment of the invention, the EPC parameter may be a numerical factor specifying the percentage of total raw data representing the TOC (obtained in Step 802) that should be modified to simulate compromised data integrity (e.g., data infection/corruption) caused, for example, by unauthorized modifications to data copies made by one or more cyber security attacks/threats. Simulating compromised data integrity may be essential for calibrating similarity measures between pairs of copy embeddings.

In Step 810, an embedding calibration iterations (ECI) parameter also specified in the verification policy (identified in Step 806) is obtained. In one embodiment of the invention, the ECI parameter may be a numerical factor specifying the total number of calibration iterations (described below) should be performed to calibrate similarity measures between pairs of copy embeddings, thereby, arriving at an approximately ideal similarity measure threshold (SMT).

Turning to FIG. 8B, Steps 820 through 828 may be repeated multiple times, where each iteration of the aforementioned steps may be disclosed herein as a calibration iteration. The number of times the aforementioned steps may be repeated may be based on the ECI parameter (obtained in Step 810).

In Step 820, a random subset of set of data blocks (segmented from the TOC in Step 804) is selected. In one embodiment of the invention, the random subset of data blocks may include one or more data blocks that may be randomly distributed or located throughout the set of data blocks. Further, collectively, the random subset of data blocks may represent a corresponding subset of raw data equaling the percentage value (of the total raw data) specified by the EPC parameter (obtained in Step 808).

In Step 822, each data block of the random subset of data blocks (selected in Step 820) is replaced. Specifically, in one embodiment of the invention, each aforementioned data block may be replaced with randomly generated data. The injection of random data, dispersed randomly throughout the TOC, may, for example, serve to simulate compromised data integrity (e.g., data infection/corruption) caused by unauthorized modifications to data copies made by one or more cyber security attacks/threats. Further, the resulting TOC, representing a compromised ODS copy, may be disclosed herein as the modified TOC.

In Step 824, a temporary copy embedding (TCE) for the modified TOC (obtained in Step 822) is generated. In one embodiment of the invention, the TCE may be a multi-dimensional vector that encodes the one or more underlying digital signatures representative of the raw data specified in the modified TOC (after being subjected to data deduplication). Further, the TCE differs from the underlying digital signature(s) that which the TCE encodes in the sense that the TCE may be compared with other copy embeddings (corresponding to other ODS copies in the DCS) to determine similarity. Generation of a copy embedding (e.g., the TCE) is described in further detail above with respect to FIG. 6.

In Step 826, a calibration copy embedding (CCE) corresponding to the COC (obtained in Step 800) is obtained. In one embodiment of the invention, because the COC is a previously vetted ODS copy in/of the DCS, a corresponding copy embedding (i.e., the CCE) may have previously been generated and stored in accordance with embodiments of the invention depicted in FIG. 6 and during the subjecting of the COC through the verification process in accordance with embodiments of the invention depicted in FIGS. 5A and 5B. Subsequently, the CCE may be retrieved from the embedding store residing within the copy verification agent (CVA) (see e.g., FIG. 3).

In Step 828, a similarity measure for the current calibration iteration is generated. In one embodiment of the invention, the similarity measure may be a measure of the alikeness of two copy embeddings (i.e., between the TCE (generated in Step 824) for the current calibration iteration and the CCE (obtained in Step 826)). Further, generation of the similarity measure may entail: (i) projecting the pair of copy embeddings into a multi-dimensional space, where, for example, a linear or non-linear mapping function may be employed to translate each copy embedding into a higher dimensional coordinate space; and (ii) computing the Euclidean distance (with dimensions representing features of the copy embeddings) between the pair of multi-dimensionally projected copy embeddings. In other embodiments of the invention, other distance definitions may alternatively be employed, which include, but are not limited to, the Chebyshev distance, the Hamming distance, the Mahalanobis distance, the Manhattan distance, and the Minkowski distance. In one or more other embodiments of the invention, the cosine similarity metric, which measures similarity based on the angle between vectors representing the multi-dimensionally projected pair of copy embeddings, may be employed in place of computing a distance.

In Step 830, a determination is made as to whether the current calibration iteration falls short of the total number of calibration iterations specified by the ECI parameter (obtained in Step 810). If it is determined that the current calibration iteration is less than the ECI parameter, then further calibration to attain the similarity measure threshold (SMT) may be required, and thus, the process proceeds to Step 820, where the next calibration iteration may be performed. On the other hand, if it is alternatively determined that the current calibration iteration matches or exceeds the ECI parameter, then sufficient calibration to attain the SMT has been achieved, and thus, the process proceeds to Step 840 (see e.g., FIG. 8C).

Turning to FIG. 8C, in Step 840, after determining (in Step 830) that the current calibration iteration matches or exceeds the ECI parameter (obtained in Step 810), a mean similarity measure (MSM) is obtained. Specifically, in one embodiment of the invention, a mean function may be applied to the set of similarity measures (obtained in repeated visitations to Step 828) to obtain the MSM. The set of similarity measures may include a respective similarity measure generated for each calibration iteration performed through each execution of Steps 820 through 828. Further, as described above, each respective similarity measure may be a measure of the alikeness between the TCE (generated in Step 824) for a corresponding calibration iteration and the CCE (obtained in Step 826). For example, assume the set of similarity measures includes a first similarity measure respective to a first TCE corresponding to a first calibration iteration, a second similarity measure respective to a second TCE corresponding to a second calibration iteration, and a third similarity measure respective to a third TCE corresponding to a third calibration iteration. Then, obtaining the MSM may entail computing the average of the first, second, and third similarity measures. In other embodiments of the invention, other statistical functions may be employed rather than the mean function such as, for example, a median function, a mode function, a standard deviation function, or a variance function.

In Step 842, the MSM (obtained in Step 840) is stored as the SMT. Specifically, in one embodiment of the invention, (i) a data object may be instantiated representing the SMT, (ii) the data object may be given the value specified by the MSM, and subsequently, (iii) the data object may be stored in the verification policy (identified in Step 806). In Step 844, the TOC/modified TOC (obtained in Step 802/Step 822) is removed or deleted.

In another embodiment of the invention, the EPC parameter (obtained in Step 808) may alternatively include a set of percentages, spaced at a specified discrete interval (e.g., 1%, 2%, 5%, etc.), ranging from zero percent to one-hundred percent (e.g., [0%, 100%]). For example, assuming that the discrete interval is set to ten percent, then the EPC parameter may specify the following set of percentages (in decimal notation): {0.1, 0.2, 0.3, 0.4, 0.5, 0.6, 0.7, 0.8, 0.9, 1.0}. The discrete interval may be another parameter specified in the verification policy for the DCS (identified in Step 806). Thereafter, Steps 820 through 830 may be repeated for each percentage value specified in the set of percentages. Following Step 830, one similarity measure between a TCE and the CCE may be generated for each percentage value in the set of percentages, thereby leading to the obtaining of a set of similarity measures. Afterwards, regression analysis may be applied to the aforementioned set of similarity measures to determine a best fit linear or non-linear function relating the set of similarity measures to the set of percentages. The regression analysis may entail employing any existing or future developed regression analysis algorithm. Further, this best fit linear or non-linear function, representative of multiple best fit similarity measures, may alternatively be stored as the SMT (in place a single fixed value—i.e., the MSM generated in Step 840). Moreover, confidence intervals for the best fit linear or non-linear function may be recorded and/or reported.

Figure 8D:
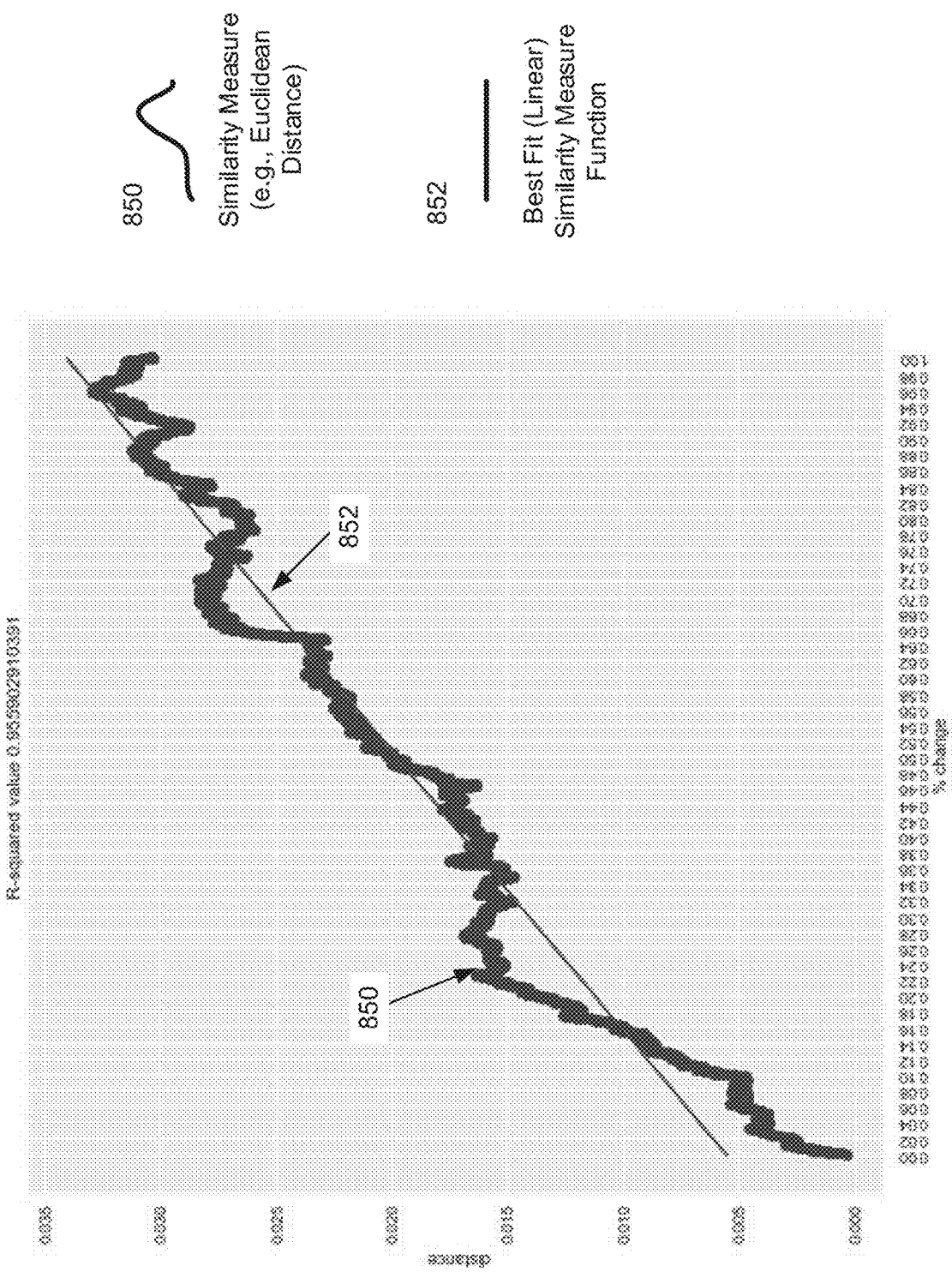
FIG. 8D shows a non-limiting example set of similarity measures subjected to regression analysis in accordance with one or more embodiments of the invention.

FIG. 8D shows a non-limiting example set of similarity measures subjected to regression analysis in accordance with one or more embodiments of the invention. That is, the following example is for explanatory purposes only and not intended to limit the scope of the invention.

Turning to FIG. 8D, FIG. 8D shows a multiline plot diagram (i.e., graph) depicting the relationship between percent change as the independent variable (i.e., the x-axis) and Euclidean distance (as a similarity measure) as the dependent variable (i.e., the y-axis). More specifically, FIG. 8D shows: (i) a first relationship (850) outlining the generated Euclidean distance for each percentage value in a set of percentages (that may have been specified in an EPC parameter (see e.g., FIGS. 8A-8C)); and (ii) a second relationship (852) representing the best fit function, obtained through linear regression analysis, for the aforementioned first relationship (850).

Figure 9:
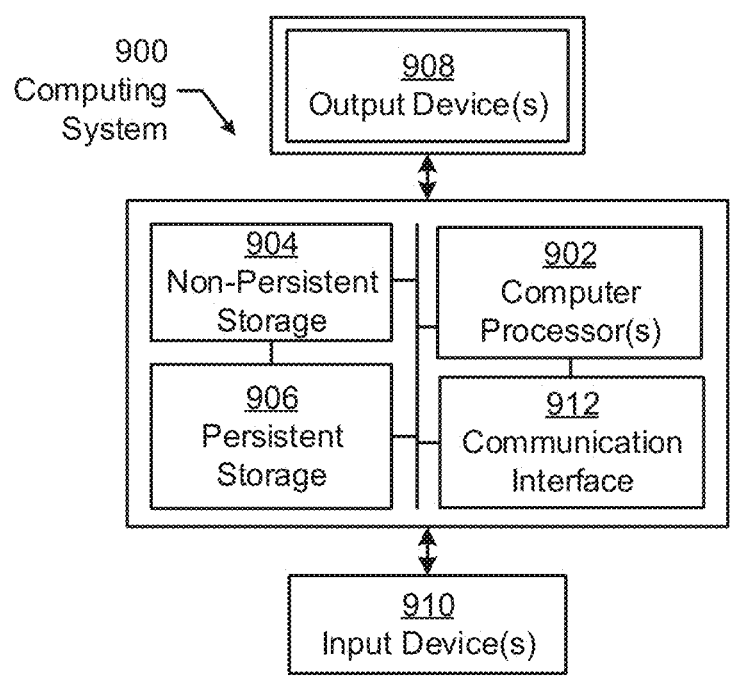
FIG. 9 shows a computing system in accordance with one or more embodiments of the invention.

FIG. 9 shows a computing system in accordance with one or more embodiments of the invention. The computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), input devices (910), output devices (908), and numerous other elements (not shown) and functionalities. Each of these components is described below.

In one embodiment of the invention, the computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device. Further, the communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

In one embodiment of the invention, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for verifying data copies, comprising:
obtaining, for an original data set (ODS), a data copy set (DCS) associated with the ODS;
identifying an initial ODS copy (IOC) in the DCS;
generating, for the IOC, an initial copy embedding (ICE) based on a plurality of fragments segmented from each copy semantic signature (CSS) of at least one CSS representative of the IOC; and
after storing the ICE, marking the IOC as verified.

2. The method of claim 1, wherein the DCS comprises a plurality of ODS copies, wherein the plurality of ODS copies comprises the IOC.

3. The method of claim 1, wherein generating the ICE for the IOC, comprises:
for each fragment in the plurality of fragments:
identifying, for each CSS of the at least one CSS, the fragment associated with the CSS to obtain a fragment set;
obtaining a mean fragment representing a mean of the fragment set;
obtaining a mean fragment set based on obtaining one mean fragment for each fragment set; and
generating the ICE using the mean fragment set.

4. The method of claim 1, further comprising:
identifying a verification policy for the DCS;
generating a similarity measure threshold (SMT) using the ICE and at least a portion of the verification policy;
identifying at least one subsequent ODS copy (SOC) in the DCS;
generating, for each SOC of the least one SOC, a subsequent copy embedding (SCE) to obtain at least one SCE;

for each SCE of the at least one SCE:
    identifying a verified ODS copy (VOC) set comprising at least the IOC;
    obtaining, for each VOC in the VOC set, one SCE in the at least one SCE to obtain a SCE subset;
    generating, for each SCE in the SCE subset, a similarity measure based on a first SCE in the SCE subset and a second SCE of the at least one SCE; and
    obtaining, based on the generating, a similarity measure set for the second SCE.

5. The method of claim 4, wherein the verification policy comprises a set of guidelines for verifying the DCS, wherein the set of guidelines comprises at least one of each of a group consisting of a workflow, an action, a threshold, and a parameter.

6. The method of claim 4, wherein the at least portion of the verification policy comprises an embedding percent change (EPC) parameter and an embedding calibration iterations (ECI) parameter.

7. The method of claim 4, further comprising:
    determining that one selected from a group consisting of at least one similarity measure in the similarity measure set and a mean similarity measure (MSM) representing a mean of the similarity measure set, exceeds the SMT; and
    marking, based on the determining, a respective SOC of the at least one SOC as verified, wherein the respective SOC corresponds to the second SCE.

8. The method of claim 4, further comprising:
    determining that one selected from a group consisting of all similarity measures of the similarity measure set and a mean similarity measure (MSM) representing a mean of the similarity measure set, does not exceed the SMT; and
    triggering, based on the determining, at least one action specified in the verification policy.

9. A data backup system (DBS), comprising:
    a first computer processor;
    a first data repository operatively connected to the first computer processor; and
    a copy verification agent (CVA) executing on the first computer processor, and programmed to:
        obtain, for an original data set (ODS), a data copy set (DCS) from the first data repository, wherein the DCS is associated with the ODS;
        identify an initial ODS copy (IOC) in the DCS;
        generate, for the IOC, an initial copy embedding (ICE) based on a plurality of fragments segmented from each copy semantic signature (CSS) of at least one CSS representative of the IOC; and
        after storing the ICE, mark the IOC as verified.

10. The DBS of claim 9, further comprising:
    an application program interface (API) and a storage semantics agent (SSA) executing on the first computer processor.

11. The DBS of claim 10, further comprising:
    a second data repository operatively connected to the DBS, wherein the second data repository stores the ODS.

12. The DBS of claim 11:
    wherein the DBS is operatively connected to a client computing system (CCS)
    wherein the CCS comprises:
        a second computer processor;
        a second data repository operatively connected to the second computer processor; and
        a data copy agent (DCA) executing on the second computer processor.

13. A non-transitory computer readable medium (CRM) comprising computer readable program code, which when executed by a computer processor, enables the computer processor to:
    obtain, for an original data set (ODS), a data copy set (DCS) associated with the ODS;
    identify an initial ODS copy (IOC) in the DCS;
    generate, for the IOC, an initial copy embedding (ICE) based on a plurality of fragments segmented from each copy semantic signature (CSS) of at least one CSS representative of the IOC; and
    after storing the ICE, mark the IOC as verified.

14. The non-transitory CRM of claim 13, wherein the DCS comprises a plurality of ODS copies, wherein the plurality of ODS copies comprises the IOC.

15. The non-transitory CRM of claim 13, further comprising computer readable program code, which when executed by the computer processor, enables the computer processor to:
    in order to generate ICE for the IOC:
        for each fragment in the plurality of fragments:
            identify, for each CSS of the at least one CSS, the fragment associated with the CSS to obtain a fragment set;
            obtain a mean fragment representing a mean of the fragment set;
        obtain a mean fragment set based on obtaining one mean fragment for each fragment set; and
        generate the ICE using the mean fragment set.

16. The non-transitory CRM of claim 13, further comprising computer readable program code, which when executed by the computer processor, enables the computer processor to:
    identify a verification policy for the DCS;
    generate a similarity measure threshold (SMT) using the ICE and at least a portion of the verification policy;
    identify at least one subsequent ODS copy (SOC) in the DCS;
    generate, for each SOC of the least one SOC, a subsequent copy embedding (SCE) to obtain at least one SCE;
    for each SCE of the at least one SCE:
        identify a verified ODS copy (VOC) set comprising at least the IOC;
        obtain, for each VOC in the VOC set, one SCE in the at least one SCE to obtain a SCE subset;
        generate, for each SCE in the SCE subset, a similarity measure based on a first SCE in the SCE subset and a second SCE of the at least one SCE; and
        obtain, based on the generating, a similarity measure set for the second SCE.

17. The non-transitory CRM of claim 16, wherein the verification policy comprises a set of guidelines for verifying the DCS, wherein the set of guidelines comprises at least one of each of a group consisting of a workflow, an action, a threshold, and a parameter.

18. The non-transitory CRM of claim 16, wherein the at least portion of the verification policy comprises an embedding percent change (EPC) parameter and an embedding calibration iterations (ECI) parameter.

19. The non-transitory CRM of claim 16, further comprising computer readable program code, which when executed by the computer processor, enables the computer processor to:
    determine that one selected from a group consisting of at least one similarity measure in the similarity measure set and a mean similarity measure (MSM) representing a mean of the similarity measure set, exceeds the SMT; and mark, based on the determining, a respective SOC of the at least one SOC as verified, wherein the respective SOC corresponds to the second SCE.

20. The non-transitory CRM of claim 16, further comprising computer readable program code, which when executed by the computer processor, enables the computer processor to:

determine that one selected from a group consisting of all similarity measures of the similarity measure set and a mean similarity measure (MSM) representing a mean of the similarity measure set, does not exceed the SMT; and trigger, based on the determining, at least one action specified in the verification policy.

* * * * *

UNITED STATES PATENT AND TRADEMARK OFFICE
CERTIFICATE OF CORRECTION

Page 1 of 1

PATENT NO. : 10,659,483 B1
APPLICATION NO. : 15/799088
DATED : May 19, 2020
INVENTOR(S) : Peter Marelas It is certified that error appears in the above-identified patent and that said Letters Patent is hereby corrected as shown below:

In the Claims

Column 20, Line 65, in Claim 4, the phrase "the least one" should read -- the at least one --.

Column 22, Line 41, in Claim 16, the phrase "the least one" should read -- the at least one --.

Signed and Sealed this
Fourteenth Day of July, 2020

Andrei Iancu
*Director of the United States Patent and Trademark Office*